(12) United States Patent
Barnett et al.

(10) Patent No.: US 8,883,485 B2
(45) Date of Patent: Nov. 11, 2014

(54) OXIDATIVE DECOLORIZATION OF DYES WITH ENZYMATICALLY GENERATED PERACID METHOD, COMPOSITION AND KIT OF PARTS

(75) Inventors: Christopher C. Barnett, Granite Bay, CA (US); Rafael F. Sala, Mountain View, CA (US)

(73) Assignee: Danisco US Inc., Palo Alto, CA (US)

( * ) Notice: Subject to any disclaimer, the term of this patent is extended or adjusted under 35 U.S.C. 154(b) by 183 days.

(21) Appl. No.: 13/254,100

(22) PCT Filed: Mar. 2, 2010

(86) PCT No.: PCT/US2010/025846
§ 371 (c)(1),
(2), (4) Date: Oct. 7, 2011

(87) PCT Pub. No.: WO2010/101867
PCT Pub. Date: Sep. 10, 2010

(65) Prior Publication Data
US 2012/0024783 A1    Feb. 2, 2012

Related U.S. Application Data

(60) Provisional application No. 61/157,099, filed on Mar. 3, 2009.

(51) Int. Cl.
*A62D 3/02* (2007.01)
*C02F 3/34* (2006.01)
*C02F 1/72* (2006.01)
*C02F 101/30* (2006.01)
*C02F 103/28* (2006.01)
*C02F 103/30* (2006.01)

(52) U.S. Cl.
CPC .......... *C02F 3/342* (2013.01); *C02F 1/722* (2013.01); *C02F 1/725* (2013.01); *C02F 2101/308* (2013.01); *C02F 2103/28* (2013.01); *C02F 2103/30* (2013.01)
USPC ......... 435/262.5; 435/263; 435/264; 435/197

(58) Field of Classification Search
USPC .................. 435/252.5, 262.5, 263, 264, 197; 210/632
See application file for complete search history.

(56) References Cited

U.S. PATENT DOCUMENTS

| | | | |
|---|---|---|---|
| 4,435,307 A | 3/1984 | Barbesgaard et al. | |
| 5,752,980 A | 5/1998 | Pedersen et al. | |
| 5,861,271 A | 1/1999 | Fowler et al. | |
| 6,399,561 B1 * | 6/2002 | Schneider et al. | 510/392 |
| 6,403,362 B1 | 6/2002 | Moriya et al. | |
| 7,138,263 B2 | 11/2006 | Murashima et al. | |
| 7,413,887 B2 | 8/2008 | Dunn-Coleman et al. | |
| 7,595,182 B2 | 9/2009 | Koga et al. | |
| 8,569,033 B2 | 10/2013 | Watanabe et al. | |
| 2006/0173209 A1 * | 8/2006 | Vineyard et al. | 562/6 |
| 2007/0128129 A1 | 6/2007 | Stehr et al. | |
| 2007/0167344 A1 | 7/2007 | Amin et al. | |
| 2008/0145353 A1 * | 6/2008 | Amin et al. | 424/94.6 |
| 2008/0189871 A1 | 8/2008 | McAuliffe et al. | |
| 2008/0196173 A1 * | 8/2008 | Wang et al. | 8/401 |
| 2009/0221030 A1 | 9/2009 | Bao et al. | |
| 2010/0029538 A1 | 2/2010 | Auterinen et al. | |
| 2010/0196287 A1 | 8/2010 | O'Connell et al. | |
| 2012/0036649 A1 | 2/2012 | Auterinen et al. | |
| 2012/0088291 A1 | 4/2012 | Vermeersch et al. | |
| 2012/0149269 A1 * | 6/2012 | Sala et al. | 442/181 |

FOREIGN PATENT DOCUMENTS

| | | |
|---|---|---|
| EP | EP0271004 | 6/1988 |
| EP | 0495257 | 7/1992 |
| JP | JP2-238885 | 9/1990 |
| WO | WO91/17244 | 11/1991 |
| WO | WO92/01046 | 1/1992 |
| WO | WO92/06221 | 4/1992 |
| WO | WO95/01426 | 1/1995 |
| WO | WO96/12845 | 5/1996 |
| WO | WO97/11217 | 3/1997 |
| WO | WO97/18286 | 5/1997 |
| WO | WO2005/056782 | 6/2005 |
| WO | WO 2005056782 A2 * | 6/2005 |
| WO | WO2007/103050 | 9/2007 |
| WO | WO2007/136469 | 11/2007 |
| WO | WO2008/019069 | 2/2008 |
| WO | WO2008/039353 | 4/2008 |
| WO | WO2008/063400 A | 5/2008 |
| WO | WO2008/076322 | 6/2008 |
| WO | WO2008/140988 | 11/2008 |
| WO | WO2009/085743 | 7/2009 |
| WO | WO2010/030769 | 3/2010 |
| WO | WO2010/075402 | 7/2010 |

OTHER PUBLICATIONS

Yahoo answer.com website http://answers.yahoo.com/questions/index?qid=20120120164859AAfCvnb downloaded Aug. 10, 2013.*
Witkowski et al. Biochemistry (1999) 38: 11643-11650.*
Whisstock et al. Quarterly Rev. Biophysics (2003) 36(3): 307-340.*
Chica et al. Current Opinion Biotechnology (2005) 16: 378-384.*
Carboni-Oerlemans et al. J. Biochemistry (2006) 126: 140-151.*
Bernhardt, P., et al., "Molecular Basis of Perhydrolase Activity in Serine Hydrolases." *Angew. Chem.* 117:2802-2806, 2005.
Guerra-Lopez, D., et al., "*Mycobacterium smegmatic* mc$^2$ 155 *fbiC* and MSMEG$_{2392}$ are involved in triphenylmethanedye decolorization and coenzyme F$_{420}$ biosynthesis." *Microbiology* 153: 2724-2732, 2007.
International Search Report and the Written Opinion of the International Searching Authority for International Application No. PCT/US2010/025846 dated Jul. 14, 2010.
International Preliminary Report on Patentability for International Application No. PCT/US2010/025846 dated Sep. 6, 2011.

* cited by examiner

*Primary Examiner* — Susan Hanley
(74) *Attorney, Agent, or Firm* — Danisco US Inc.

(57) ABSTRACT

Described are compositions and methods for the decolorization of dye molecules in an aqueous medium using enzymatically-generated peracid.

21 Claims, 15 Drawing Sheets

SEQUENCE LISTING

```
<160> NUMBER OF SEQ ID NOS: 3

<210> SEQ ID NO 1
<211> LENGTH: 216
<212> TYPE: PRT
<213> ORGANISM: Mycobacterium smegmatis

<400> SEQUENCE: 1

Met Ala Lys Arg Ile Leu Cys Phe Gly Asp Ser Leu Thr Trp Gly Trp
1               5                   10                  15

Val Pro Val Glu Asp Gly Ala Pro Thr Glu Arg Phe Ala Pro Asp Val
            20                  25                  30

Arg Trp Thr Gly Val Leu Ala Gln Gln Leu Gly Ala Asp Phe Glu Val
```

```
                35                  40                  45
Ile Glu Glu Gly Leu Ser Ala Arg Thr Thr Asn Ile Asp Asp Pro Thr
 50                  55                  60

Asp Pro Arg Leu Asn Gly Ala Ser Tyr Leu Pro Ser Cys Leu Ala Thr
 65                  70                  75                  80

His Leu Pro Leu Asp Leu Val Ile Ile Met Leu Gly Thr Asn Asp Thr
                 85                  90                  95

Lys Ala Tyr Phe Arg Arg Thr Pro Leu Asp Ile Ala Leu Gly Met Ser
                100                 105                 110

Val Leu Val Thr Gln Val Leu Thr Ser Ala Gly Gly Val Gly Thr Thr
            115                 120                 125

Tyr Pro Ala Pro Lys Val Leu Val Ser Pro Pro Leu Ala Pro
130                 135                 140

Met Pro His Pro Trp Phe Gln Leu Ile Phe Glu Gly Gly Glu Gln Lys
145                 150                 155                 160

Thr Thr Glu Leu Ala Arg Val Tyr Ser Ala Leu Ala Ser Phe Met Lys
                165                 170                 175

Val Pro Phe Phe Asp Ala Gly Ser Val Ile Ser Thr Asp Gly Val Asp
                180                 185                 190

Gly Ile His Phe Thr Glu Ala Asn Asn Arg Asp Leu Gly Val Ala Leu
            195                 200                 205

Ala Glu Gln Val Arg Ser Leu Leu
    210                 215
```

```
<210> SEQ ID NO 2
<211> LENGTH: 651
<212> TYPE: DNA
<213> ORGANISM: Mycobacterium smegmatis

<400> SEQUENCE: 2
atggccaagc gaattctgtg tttcggtgat tccctgacct ggggctgggt ccccgtcgaa      60
gacggggcac ccaccgagcg gttcgccccc gacgtgcgct ggaccggtgt gctggcccag     120
cagctcggag cggacttcga ggtgatcgag gagggactga gcgcgcgcac caccaacatc     180
gacgacccca ccgatccgcg gctcaacggc gcgagctacc tgccgtcgtg cctcgcgacg     240
cacctgccgc tcgacctggt gatcatcatg ctgggcacca acgacaccaa ggcctacttc     300
cggcgcaccc cgctcgacat cgcgctgggc atgtcggtgc tcgtcacgca ggtgctcacc     360
agcgcgggcg gcgtcggcac cacgtacccg gcacccaagg tgctggtggt ctcgccgcca     420
ccgctggcgc ccatgccgca ccctggttc cagttgatct cgagggcgg cgagcagaag      480 accactgagc tcgcccgcgt gtacagcgcg ctcgcgtcgt tcatgaaggt gccgttcttc     540
gacgcgggtt cggtgatcag caccgacggc gtcgacggaa tccacttcac cgaggccaac     600
aatcgcgatc tcggggtggc cctcgcggaa caggtgcgga gcctgctgta a              651
```

```
<210> SEQ ID NO 3
<211> LENGTH: 216
<212> TYPE: PRT
<213> ORGANISM: Artificial Sequence
<220> FEATURE:
<223> OTHER INFORMATION: synthetic variant of SEQ ID NO:1

<400> SEQUENCE: 3

Met Ala Lys Arg Ile Leu Cys Phe Gly Asp Ser Leu Thr Trp Gly Trp
 1               5                  10                  15

Val Pro Val Glu Asp Gly Ala Pro Thr Glu Arg Phe Ala Pro Asp Val
```

-continued

```
                      20                  25                  30
Arg Trp Thr Gly Val Leu Ala Gln Gln Leu Gly Ala Asp Phe Glu Val
            35                  40                  45
Ile Glu Glu Gly Leu Val Ala Arg Thr Thr Asn Ile Asp Asp Pro Thr
 50                  55                  60
Asp Pro Arg Leu Asn Gly Ala Ser Tyr Leu Pro Ser Cys Leu Ala Thr
 65                  70                  75                  80
His Leu Pro Leu Asp Leu Val Ile Ile Met Leu Gly Thr Asn Asp Thr
                85                  90                  95
Lys Ala Tyr Phe Arg Arg Thr Pro Leu Asp Ile Ala Leu Gly Met Ser
            100                 105                 110
Val Leu Val Thr Gln Val Leu Thr Ser Ala Gly Gly Val Gly Thr Thr
        115                 120                 125
Tyr Pro Ala Pro Lys Val Leu Val Val Ser Pro Pro Pro Leu Ala Pro
        130                 135                 140
Met Pro His Pro Trp Phe Gln Leu Ile Phe Glu Gly Gly Glu Gln Lys
145                 150                 155                 160
Thr Thr Glu Leu Ala Arg Val Tyr Ser Ala Leu Ala Ser Phe Met Lys
                165                 170                 175
Val Pro Phe Phe Asp Ala Gly Ser Val Ile Ser Thr Asp Gly Val Asp
                180                 185                 190
Gly Ile His Phe Thr Glu Ala Asn Asn Arg Asp Leu Gly Val Ala Leu
        195                 200                 205
Ala Glu Gln Val Arg Ser Leu Leu
210                 215
```

OXIDATIVE DECOLORIZATION OF DYES WITH ENZYMATICALLY GENERATED PERACID METHOD, COMPOSITION AND KIT OF PARTS

PRIORITY

The present application claims priority under 35 USC §371 to International Application No. PCT/US2010/025846, filed on Mar. 2, 2010, which claims the benefit of U.S. Provisional Patent Application Ser. No. 61/157,099, filed on Mar. 3, 2009, each of which are hereby incorporated by reference.

SEQUENCE LISTING

The sequence listing submitted via EFS, in compliance with 37 C.F.R. §1.52(e), is incorporated herein by reference. The sequence listing text file submitted via EFS contains the file "31063US2ASeqList", created on Aug. 29, 2011, which is 5,205 bytes in size.

TECHNICAL FIELD

The compositions and methods relate to decolorization of dye molecules in an aqueous medium using enzymatically generated peracid.

BACKGROUND

The dyeing of textile materials is not an efficient process, as much of the dye used to dye textiles remains in the dyeing medium. Because the exact composition of the partially-depleted dyeing medium varies, reuse of the depleted dyeing medium may produce inconsistent results. As a consequence, this residual dyeing medium is typically discarded, resulting in the release of large amounts of dye-contaminated wastewater into the environment. Colored industrial effluent can cause considerable damage to the ecosystem, e.g., due to their effects on photosynthetic activity in aquatic life due to reduced light penetration.

Conventional treatment techniques applied to textile wastewater for dye removal include physical methods (coagulation/flocculation), membrane separation (ultrafiltration, reverse osmosis), and elimination by activated carbon adsorption. Such methods are costly and also result in phase transfer of pollutants. Current microbiological methods are not an efficient solution to treatment of the wastewater due to the complex structures of some dyes that render them resistant to biodegradation.

Chemical decomposition of dye is generally carried out in two distinct ways. Dye may be partially removed using dilute hydrochloric acid or formic acid solutions in a process known as "brightening." Alternatively, dye may be decomposed using reducing agents, oxidizing agents and discharging assistants, in a process known as "stripping."

Oxidation using hydrogen peroxide ($H_2O_2$) is commonly used because cleaner byproducts are generated in comparison to agents such as chlorine or conventional bleach (i.e., hypochlorite). $H_2O_2$ is known to be ineffective with anthraquinone or azo dyes, which are widely-used and have a significant environmental impact. In addition, the decolorization reaction with $H_2O_2$ is slow. Faster oxidative decolorization methods utilize advanced oxidative processes (AOPs) process, which typically use ozone ($O_3$), ozone activated with ultraviolet light (UV)/$O_3$, hydrogen peroxide activated with UV (UV/$H_2O_2$), or "activators" that generate stronger oxidizing agents such as peracids. Such processes can be prohibitively expensive on a large scale, e.g., due to the cost of chemical activators or ultraviolet energy.

Stripping is typically performed with alkaline sodium dithionite, sodium chlorate, sodium hypochorite or thioureadioxide. These chemicals are environmentally unfriendly and from a health and safety aspect need careful handling.

The need exists for more efficient and environmentally friendly methods for decolorization of dyes.

SUMMARY

Methods and compositions are provided for decolorization of a dye in aqueous medium.

In one aspect, a method for decolorizing a dye is provided, comprising contacting the dye with a composition comprising: a perhydrolase enzyme, a substrate for the perhydrolase enzyme, and a hydrogen peroxide source; wherein a peracid is produced by catalytic action of the perhydrolase enzyme on the substrate in the presence of hydrogen peroxide; and wherein the dye is contacted with the composition for a length of time and under conditions suitable to produce an amount of peracid sufficient to decolorize at least a portion of the dye.

In a related aspect, a method is provided for decolorizing a dye, including contacting the dye with an enzymatically generated peracid, wherein the dye is decolorized by the peracid to a greater extent than with an equivalent composition lacking enzymatically generated peracid. In another related aspect, a method is provided for decolorizing a dye, including contacting the dye with a composition that includes a perhydrolase enzyme, a substrate for the perhydrolase enzyme, and a hydrogen peroxide source, wherein a peracid is produced by catalytic action of the perhydrolase enzyme on the substrate in the presence of hydrogen peroxide, wherein the dye is contacted with the composition for a length of time and under conditions suitable to produce an amount of the peracid that is sufficient to decolorize the dye, including changing the tone, shade, tint, or brightness of the dye.

In some embodiments, the dye is present in wastewater effluent. In some embodiments, the wastewater effluent is from a textile processing process. In some embodiments, the textile processing process is a textile dyeing process. In some embodiments, the wastewater effluent is from pulp or paper processing process. In some embodiments, the pulp or paper processing process is a deinking process.

In various embodiments, at least about 40%, at least about 50%, at least about 60%, at least about 70%, at least about 80%, at least about 90%, or even at least about 95% of the dye in the aqueous medium is decolorized. In particular embodiments, at least 40% of the dye is decolorized. In particular embodiments, at least 50% of the dye is decolorized. In particular embodiments, at least 60% of the dye is decolorized. In particular embodiments, at least 70% of the dye is decolorized. In particular embodiments, at least 80% of the dye is decolorized.

In some embodiments, at least twice as much of the dye in the effluent is decolorized compared to the amount of dye that is decolorized in an equivalent method lacking the perhydrolase enzyme. In some embodiments, at least three times as much of the dye in the effluent is decolorized compared to the amount of dye that is decolorized in an equivalent method lacking the perhydrolase enzyme.

In some embodiments, the perhydrolase enzyme catalyzes perhydrolysis of the ester substrate with a perhydrolysis:hydrolysis ratio equal to or greater than 1. In some embodiments, the perhydrolase enzyme comprises the amino acid sequence set forth in SEQ ID NO: 1, or a variant or homolog thereof. In some embodiments, the perhydrolase enzyme comprises an amino acid sequence having at least 70% amino acid sequence identity to the amino sequence set forth in SEQ ID NO: 1. In some embodiments, the perhydrolase enzyme is the S54V variant of the perhydrolase enzyme having the amino acid sequence of SEQ ID NO: 1. In some embodiments, the perhydrolase enzyme comprises an amino acid sequence having at least 70% amino acid sequence identity to the amino sequence set forth in SEQ ID NO: 3. In some embodiments, the perhydrolase enzyme comprises an amino acid sequence having at least 80%, at least 85%, at least 90%, or even at least 95%, amino acid sequence identity to the amino sequence set forth in SEQ ID NOs: 1 or 3.

In some embodiments, the ester substrate is selected from the group consisting of propylene glycol diacetate (PGDA), ethylene glycol diacetate (EGDA), tracetin, ethyl acetate, and tributyrin. In particular embodiments, the substrate is PGDA. In particular embodiments, the substrate is EGDA. In some embodiments, the hydrogen peroxide is provided in the form of a hydrogen peroxide source selected from the group consisting of hydrogen peroxide, percarbonate, and perborate. In some embodiments, the dye is a textiles dye.

In some embodiments, the molar ratio of carboxylic acid ester moieties in the substrate to enzyme molecules is from about $4 \times 10^5/1$ to about $4 \times 10^6/1$. In some embodiments, the molar ratio of carboxylic acid ester moieties in the substrate to enzyme molecules in the aqueous medium is at least about $2 \times 10^5/1$. In some embodiments, the molar ratio of carboxylic acid ester moieties in the substrate to enzyme molecules is at least about $4 \times 10^5/1$. In some embodiments, the molar ratio of carboxylic acid ester moieties in the substrate to dye molecules is at least about 1,000/1. In some embodiments, the molar ratio of carboxylic acid ester moieties in the ester substrate to dye molecules is from about 1,000/1 to about 10,000/1. In some embodiments, the concentration of perhydrolase enzyme is less than or equal to $5 \times 10^{-6}$ M.

In another aspect, a composition for use in an oxidative dye decolorization method is provided, the composition comprising a perhydrolase enzyme, a substrate for the perhydrolase enzyme, and a hydrogen peroxide source, in a molar ratio of substrate/enzyme/peroxide that is suitable for oxidatively decolorizing a dye in a liquid medium. In some embodiments, the molar ratio of carboxylic acid ester moieties in the substrate to enzyme molecules in the aqueous medium is at least about $2 \times 10^5/1$. In some embodiments, the molar ratio of carboxylic acid ester moieties in the substrate to enzyme molecules in the aqueous medium is at least about $4 \times 10^5/1$. In some embodiments, the molar ratio of carboxylic acid ester moieties in the substrate to enzyme molecules is from about $4 \times 10^5/1$ to about $4 \times 10^6/1$. In some embodiments, the molar ratio of carboxylic acid ester moieties in the substrate to dye molecules is at least about 1,000/1. In some embodiments, the molar ratio of carboxylic acid ester moieties in the substrate to dye molecules is from about 1,000/1 to about 10,000/1. In some embodiments, the concentration of perhydrolase enzyme is less than or equal to $5 \times 10^{-6}$ M.

In another aspect, a kit of parts for use in an oxidative dye decolorization method is provided, the kit of parts comprising any of the described compositions.

These and other aspects and embodiments of present methods and composition will be apparent from the description.

DETAILED DESCRIPTION

Definitions

Figure 1:
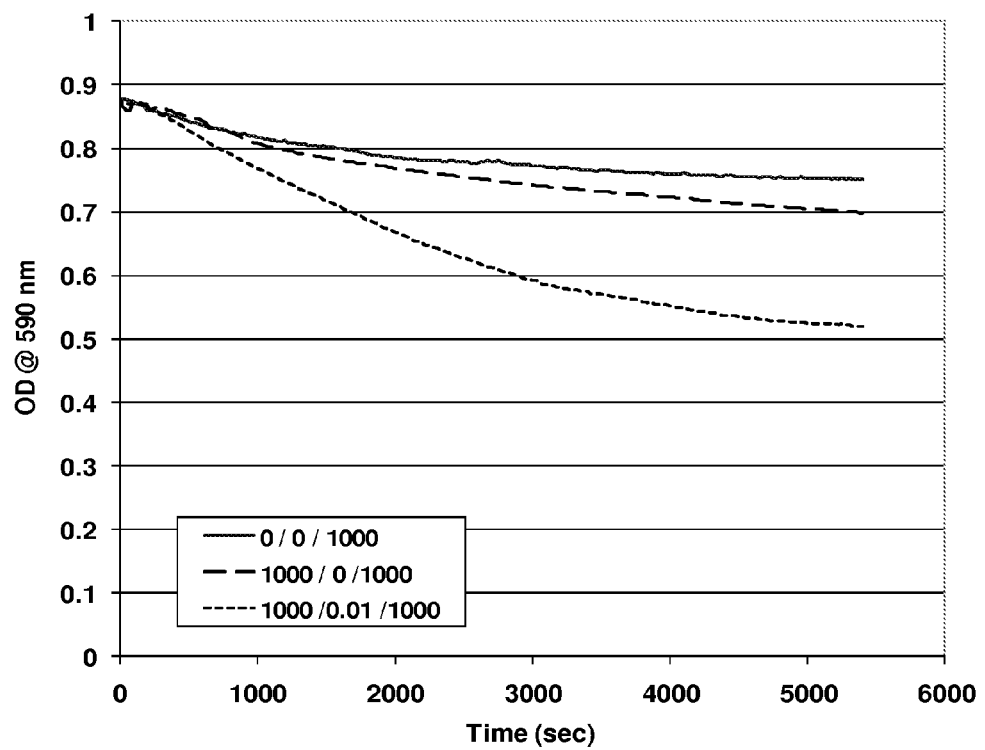
FIG. 1 is a graph showing oxidative decolorization of Reactive Black 5 at room temperature, optionally in the presence of EGDA or EGDA and perhydrolase enzyme.

Prior to describing the present compositions and methods in detail, the following terms are defined for clarity. Terms not defined should be given their ordinary meanings as using in the relevant art.

As used herein, a "perhydrolase" is an enzyme capable of catalyzing a perhydrolysis reaction that results in the production of a sufficiently high amount of peracid for use in an oxidative dye decolorization method as described. Generally, the perhydrolase enzyme exhibits a high perhydrolysis to hydrolysis ratio. In some embodiments, the perhydrolase comprises, consists of, or consists essentially of the *Mycobacterium smegmatis* perhydrolase amino acid sequence set forth in SEQ ID NO: 1, or a variant or homolog thereof. In some embodiments, the perhydrolase enzyme comprises acyltransferase and/or arylesterase activity.

As used herein, the terms "perhydrolyzation," "perhydrolyze," or "perhydrolysis" refer to a reaction wherein a peracid is generated from ester and hydrogen peroxide substrate. In some embodiments, the perhydrolyzation reaction is catalyzed with a perhydrolase, e.g., acyl transferase or aryl esterase, enzyme. In some embodiments, a peracid is produced by perhydrolysis of an ester substrate of the formula $R_1C(=O)OR_2$, where $R_1$ and $R_2$ are the same or different organic moieties, in the presence of hydrogen peroxide ($H_2O_2$). In some embodiments, —$OR_2$ is —OH. In some embodiments, —$OR_2$ is replaced by —$NH_2$. In some embodiments, a peracid is produced by perhydrolysis of a carboxylic acid or amide substrate.

As used herein, an "effective amount of perhydrolase enzyme" refers to the quantity of perhydrolase enzyme necessary to produce the decolorization effects described herein. Such effective amounts are determined by the skilled artisan in view of the present description, and are based on several factors, such as the particular enzyme variant used, the pH used, the temperature used, and the like, as well as the results desired (e.g., level of whiteness).

As used herein, the term "peracid" refers to a molecule derived from a carboxylic acid ester that has been reacted with hydrogen peroxide to form a highly reactive product having the general formula RC(=O)OOH. Such peracid products are able to transfer one of their oxygen atoms to another molecule, such as a dye. It is this ability to transfer oxygen atoms that enables a peracid, for example, peracetic acid, to function as a bleaching agent.

As used herein, an "ester substrate," with reference to an oxidative dye decolorization system containing a perhydrolase enzyme, refers to a perhydrolase substrate that contains an ester linkage. Esters comprising aliphatic and/or aromatic carboxylic acids and alcohols may be utilized as substrates with perhydrolase enzymes. In some embodiments, the ester source is an acetate ester. In some embodiments, the ester source is selected from one or more of propylene glycol diacetate, ethylene glycol diacetate, triacetin, ethyl acetate and tributyrin. In some embodiments, the ester source is selected from the esters of one or more of the following acids: formic acid, acetic acid, propionic acid, butyric acid, valeric acid, caproic acid, caprylic acid, nonanoic acid, decanoic acid, dodecanoic acid, myristic acid, palmitic acid, stearic acid, and oleic acid.

As used herein, the term "hydrogen peroxide source" refers to a molecule capable of generating hydrogen peroxide, e.g., in situ. Hydrogen peroxide sources include hydrogen peroxide, itself, as well as molecules that spontaneously or enzymatically produce hydrogen peroxide as a reaction product. Such molecules include, e.g., perborate and percarbonate.

As used herein, the phrase "perhydrolysis to hydrolysis ratio" refers to the ratio of enzymatically produced peracid to enzymatically produced acid (e.g., in moles) that is produced by a perhydrolase enzyme from an ester substrate under defined conditions and within a defined time. In some embodiments, the assays provided in WO 05/056782 are used to determine the amounts of peracid and acid produced by the enzyme.

As used herein, the term "acyl" refers to an organic group with the general formula RCO—, derived from an organic acid by removal of the —OH group. Typically, acyl group names end with the suffix "-oyl," e.g., methanoyl chloride, $CH_3CO$—Cl, is the acyl chloride formed from methanoic acid, $CH_3CO$—OH).

As used herein, the term "acylation" refers to a chemical transformation in which one of the substituents of a molecule is substituted by an acyl group, or the process of introduction of an acyl group into a molecule.

As used herein, the term "transferase" refers to an enzyme that catalyzes the transfer of a functional group from one substrate to another substrate. For example, an acyl transferase may transfer an acyl group from an ester substrate to a hydrogen peroxide substrate to form a peracid.

As used herein, the term "hydrogen peroxide generating oxidase" refers to an enzyme that catalyzes an oxidation/reduction reaction involving molecular oxygen ($O_2$) as the electron acceptor. In such a reaction, oxygen is reduced to water ($H_2O$) or hydrogen peroxide ($H_2O_2$). An oxidase suitable for use herein is an oxidase that generates hydrogen peroxide (as opposed to water) on its substrate. An example of a hydrogen peroxide generating oxidase and its substrate suitable for use herein is glucose oxidase and glucose. Other oxidase enzymes that may be used for generation of hydrogen peroxide include alcohol oxidase, ethylene glycol oxidase, glycerol oxidase, amino acid oxidase, etc. In some embodiments, the hydrogen peroxide generating oxidase is a carbohydrate oxidase.

As used herein, the term "textile" refers to fibers, yarns, fabrics, garments, and non-wovens. The term encompasses textiles made from natural, synthetic (e.g., manufactured), and various natural and synthetic blends. Thus, the term "textile(s)" refers to unprocessed and processed fibers, yarns, woven or knit fabrics, non-wovens, and garments. In some embodiments, a textile contains cellulose.

As used herein, the term "fabric" refers to a manufactured assembly of fibers and/or yarns that has substantial surface area in relation to its thickness and sufficient cohesion to give the assembly useful mechanical strength.

As used herein, the term "non-cotton cellulosic" fiber, yarn or fabric means fibers, yarns or fabrics which are comprised primarily of a cellulose based composition other than cotton. Examples of such compositions include linen, ramie, jute, flax, rayon, lyocell, cellulose acetate, bamboo and other similar compositions which are derived from non-cotton cellulosics.

As used herein, the terms "purified" and "isolated" refer to the removal of contaminants from a sample and/or to a material (e.g., a protein, nucleic acid, cell, etc.) that is removed from at least one component with which it is naturally associated. For example, these terms may refer to a material which is substantially or essentially free from components which normally accompany it as found in its native state, such as, for example, an intact biological system As used herein, the term "polynucleotide" refers to a polymeric form of nucleotides of any length and any three-dimensional structure and single- or multi-stranded (e.g., single-stranded, double-stranded, triple-helical, etc.), which contain deoxyribonucleotides, ribonucleotides, and/or analogs or modified forms of deoxyribonucleotides or ribonucleotides, including modified nucleotides or bases or their analogs. Because the genetic code is degenerate, more than one codon may be used to encode a particular amino acid. Any type of modified nucleotide or nucleotide analog may be used, so long as the polynucleotide retains the desired functionality under conditions of use, including modifications that increase nuclease resistance (e.g., deoxy, 2'-O-Me, phosphorothioates, etc.). Labels may also be incorporated for purposes of detection or capture, for example, radioactive or nonradioactive labels or anchors, e.g., biotin. The term polynucleotide also includes peptide nucleic acids (PNA). Polynucleotides may be naturally occurring or non-naturally occurring. The terms "polynucleotide" and "nucleic acid" and "oligonucleotide" are used herein interchangeably. Polynucleotides may contain RNA, DNA, or both, and/or modified forms and/or analogs thereof. A sequence of nucleotides may be interrupted by non-nucleotide components. One or more phosphodiester linkages may be replaced by alternative linking groups. These alternative linking groups include, but are not limited to, embodiments wherein phosphate is replaced by P(O)S ("thioate"), P(S)S ("dithioate"), (O)$NR_2$ ("amidate"), P(O)R, P(O)OR', CO or $CH_2$ ("formacetal"), in which each R or R' is independently H or substituted or unsubstituted alkyl (1-20 C) optionally containing an ether (—O—) linkage, aryl, alkenyl, cycloalkyl, cycloalkenyl or araldyl. Not all linkages in a polynucleotide need be identical. Polynucleotides may be linear or circular or comprise a combination of linear and circular portions.

As used herein, "polypeptide" refers to any composition comprised of amino acids and recognized as a protein by those of skill in the art. The conventional one-letter or three-letter code for amino acid residues is used herein. The terms "polypeptide" and "protein" are used interchangeably herein to refer to polymers of amino acids of any length. The polymer may be linear or branched, it may comprise modified amino acids, and it may be interrupted by non-amino acids. The terms also encompass an amino acid polymer that has been modified naturally or by intervention; for example, disulfide bond formation, glycosylation, lipidation, acetylation, phosphorylation, or any other manipulation or modification, such as conjugation with a labeling component. Also included within the definition are, for example, polypeptides containing one or more analogs of an amino acid (including, for example, unnatural amino acids, etc.), as well as other modifications known in the art.

As used herein, functionally and/or structurally similar proteins are considered to be "related proteins." In some embodiments, these proteins are derived from a different genus and/or species, including differences between classes of organisms (e.g., a bacterial protein and a fungal protein). In additional embodiments, related proteins are provided from the same species. Indeed, it is not intended that the processes, methods and/or compositions described herein be limited to related proteins from any particular source(s). In addition, the term "related proteins" encompasses tertiary structural homologs and primary sequence homologs. In further embodiments, the term encompasses proteins that are immunologically cross-reactive.

As used herein, the term "derivative" refers to a protein which is derived from a protein by addition of one or more amino acids to either or both the C- and N-terminal end(s), substitution of one or more amino acids at one or a number of different sites in the amino acid sequence, and/or deletion of one or more amino acids at either or both ends of the protein or at one or more sites in the amino acid sequence, and/or insertion of one or more amino acids at one or more sites in the amino acid sequence. The preparation of a protein derivative is preferably achieved by modifying a DNA sequence which encodes for the native protein, transformation of that DNA sequence into a suitable host, and expression of the modified DNA sequence to form the derivative protein.

Related (and derivative) proteins comprise "variant proteins." In some embodiments, variant proteins differ from a parent protein, e.g., a wild-type protein, and one another by a small number of amino acid residues. The number of differing amino acid residues may be one or more, for example, 1, 2, 3, 4, 5, 10, 15, 20, 30, 40, 50, or more amino acid residues. In some aspects, related proteins and particularly variant proteins comprise at least 35%, 40%, 45%, 50%, 55%, 60%, 65%, 70%, 75%, 80%, 85%, 90%, 91%, 92%, 93%, 94%, 95%, 96%, 97%, 98%, or even 99% or more amino acid sequence identity. Additionally, a related protein or a variant protein refers to a protein that differs from another related protein or a parent protein in the number of prominent regions. For example, in some embodiments, variant proteins have 1, 2, 3, 4, 5, or 10 corresponding prominent regions that differ from the parent protein. Prominent regions include structural features, conserved regions, epitopes, domains, motifs, and the like.

Methods are known in the art that are suitable for generating variants of the enzymes described herein, including but not limited to site-saturation mutagenesis, scanning mutagenesis, insertional mutagenesis, random mutagenesis, site-directed mutagenesis, and directed-evolution, as well as various other recombinatorial approaches.

As used herein, the term "analogous sequence" refers to a sequence within a protein that provides similar function, tertiary structure, and/or conserved residues as the protein of interest (i.e., typically the original protein of interest). For example, in epitope regions that contain an alpha-helix or a beta-sheet structure, the replacement amino acids in the analogous sequence preferably maintain the same specific structure. The term also refers to nucleotide sequences, as well as amino acid sequences. In some embodiments, analogous sequences are developed such that the replacement amino acids result in a variant enzyme showing a similar or improved function. In some embodiments, the tertiary structure and/or conserved residues of the amino acids in the protein of interest are located at or near the segment or fragment of interest. Thus, where the segment or fragment of interest contains, for example, an alpha-helix or a beta-sheet structure, the replacement amino acids preferably maintain that specific structure.

As used herein, the term "homologous protein" refers to a protein that has similar activity and/or structure to a reference protein. It is not intended that homologs necessarily be evolutionarily related. Thus, it is intended that the term encompass the same, similar, or corresponding enzyme(s) (i.e., in terms of structure and function) obtained from different organisms. In some embodiments, it is desirable to identify a homolog that has a quaternary, tertiary and/or primary structure similar to the reference protein. In some embodiments, homologous proteins induce similar immunological response(s) as a reference protein. In some embodiments, homologous proteins are engineered to produce enzymes with desired activity(ies).

The degree of homology between sequences may be determined using any suitable method known in the art (see, e.g., Smith and Waterman (1981) *Adv. Appl. Math.* 2:482; Needleman and Wunsch (1970) *J. Mol. Biol.*, 48:443; Pearson and Lipman (1988) *Proc. Natl. Acad. Sci. USA* 85:2444; programs such as GAP, BESTFIT, FASTA, and TFASTA in the Wisconsin Genetics Software Package (Genetics Computer Group, Madison, Wis.); and Devereux et al. (1984) *Nucleic Acids Res.* 12:387-395).

For example, PILEUP is a useful program to determine sequence homology levels. PILEUP creates a multiple sequence alignment from a group of related sequences using progressive, pair-wise alignments. It can also plot a tree showing the clustering relationships used to create the alignment. PILEUP uses a simplification of the progressive alignment method of Feng and Doolittle, (Feng and Doolittle (1987) *J. Mol. Evol.* 35:351-360). The method is similar to that described by Higgins and Sharp (Higgins and Sharp (1989) *CABIOS* 5:151-153). Useful PILEUP parameters including a default gap weight of 3.00, a default gap length weight of 0.10, and weighted end gaps. Another example of a useful algorithm is the BLAST algorithm, described by Altschul et al. (Altschul et al. (1990) *J. Mol. Biol.* 215:403-410; and Karlin et al. (1993) *Proc. Natl. Acad. Sci. USA* 90:5873-5787). One particularly useful BLAST program is the WU-BLAST-2 program (See, Altschul et al. (1996) *Meth. Enzymol.* 266:460-480). Parameters "W," "T," and "X" determine the sensitivity and speed of the alignment. The BLAST program uses as defaults a word-length (W) of 11, the BLOSUM62 scoring matrix (See, Henikoff and Henikoff (1989) *Proc. Natl. Acad. Sci. USA* 89:10915) alignments (B) of 50, expectation (E) of 10, M'5, N'-4, and a comparison of both strands.

As used herein, the phrases "substantially similar" and "substantially identical," in the context of at least two nucleic acids or polypeptides, typically means that a polynucleotide or polypeptide comprises a sequence that has at least about 40% identity, more preferable at least about 50% identity, yet more preferably at least about 60% identity, preferably at least about 75% identity, more preferably at least about 80% identity, yet more preferably at least about 90%, at least about 91%, at least about 92%, at least about 93%, at least about 94%, at least about 95%, at least about 96%, at least about 97%, at least about 98%, or even at least about 99% sequence identity, compared to the reference (i.e., wild-type) sequence. Sequence identity may be determined using known programs such as BLAST, ALIGN, and CLUSTAL using standard parameters. (See e.g., Altschul, et al. (1990) *J. Mol. Biol.* 215:403-410; Henikoff et al. (1989) *Proc. Natl. Acad. Sci. USA* 89:10915; Karin et al. (1993) *Proc. Natl. Acad. Sci. USA* 90:5873; and Higgins et al. (1988) *Gene* 73:237-244). Software for performing BLAST analyses is publicly available through the National Center for Biotechnology Information. Also, databases may be searched using FASTA (Pearson et al. (1988) *Proc. Natl. Acad. Sci. USA* 85:2444-2448). One indication that two polypeptides are substantially identical is that the first polypeptide is immunologically cross-reactive with the second polypeptide. Typically, polypeptides that differ by conservative amino acid substitutions are immunologically cross-reactive. Thus, a polypeptide is substantially identical to a second polypeptide, for example, where the two peptides differ only by a conservative substitution. Another indication that two nucleic acid sequences are substantially identical is that the two molecules hybridize to each other under stringent conditions (e.g., within a range of medium to high stringency).

As used herein, "wild-type" and "native" proteins are those found in nature. The terms "wild-type sequence," and "wild-type gene" are used interchangeably herein, to refer to a sequence that is native or naturally occurring in a host cell. In some embodiments, the wild-type sequence refers to a sequence of interest that is the starting point of a protein engineering project. The genes encoding the naturally-occurring protein may be obtained in accord with the general methods known to those skilled in the art. The methods generally comprise synthesizing labeled probes having putative sequences encoding regions of the protein of interest, preparing genomic libraries from organisms expressing the protein, and screening the libraries for the gene of interest by hybridization to the probes. Positively hybridizing clones are then mapped and sequenced.

As used herein, the term "dyeing," refers to applying a color, especially by soaking in a coloring solution, to, for example, textiles.

As used herein, the term "dye" refers to a colored substance (i.e., chromophore) that has an affinity to a substrate to which it is applied. Numerous classes of dyes are described herein.

As used herein, the terms "decolorizing" and "decolorization" refer to color elimination or reduction via the destruction, modification, or removal of dye, e.g., from an aqueous medium. In some embodiments, decolorizing or decolorization is defined as a percentage of color removal from aqueous medium. The amount of color removal can be determined by comparing the color level following treatment with a perhydrolase enzyme (i.e., residual color level) to the color level of the starting aqueous medium (i.e., original color level) using known spectrophotometric or visual inspection methods.

As used herein, the term "original color level" refers to the color level of an aqueous medium comprising at least one dye component prior to contact with a perhydrolase enzyme as described, herein. Original color level may be measured using known spectrophotometric or visual inspection methods.

As used herein, the term "residual color level" refers to the color level of an aqueous medium comprising at least one dye component prior to contact with a perhydrolase enzyme as described, herein. Original color level may be measured using known spectrophotometric or visual inspection methods.

As used herein, an "aqueous medium" is a solution and/or suspension primarily comprising water as a solvent. The aqueous medium typically includes at least one dye to be decolorized, as well as any number of dissolved or suspended components, including but not limited to surfactants, salts, buffers, stabilizers, complexing agents, chelating agents, builders, metal ions, additional enzymes and substrates, and the like. Exemplary aqueous media are textile dying solutions. Materials such as paper pulp, textile articles, textile fibers, and other solid materials may also be present in or in contact with the aqueous medium.

As used herein, "packaging" refers to a container capable of providing a perhydrolase enzyme, substrate for the perhydrolase enzyme, and/or hydrogen peroxide source in an easy to handle and transport form. Exemplary packaging includes boxes, tubs, cans, barrels, drums, bags, or even tanker trucks.

As used herein, the term "contacting" means incubating in the presence of, typically in aqueous solution.

As used herein, the singular articles "a," "an," and "the" encompass the plural referents unless the context clearly dictates otherwise. All references sited herein are hereby incorporated by reference in their entirety.

The following abbreviations/acronyms have the following meanings unless otherwise specified:

cDNA complementary DNA
DNA deoxyribonucleic acid
EC enzyme commission
kDa kiloDalton
MW molecular weight
SDS-PAGE sodium dodecyl sulfate polyacrylamide gel electrophoresis
w/v weight/volume
w/w weight/weight
v/v volume/volume
wt % weight percent
° C. degrees Centigrade
$H_2O$ water
$H_2O_2$ hydrogen peroxide
$dH_2O$ or DI deionized water
$dIH_2O$ deionized water, Milli-Q filtration
g or gm gram
μg microgram
mg milligram
kg kilogram
μL and μl microliter
mL and ml milliliter
mm millimeter
μm micrometer
M molar
mM millimolar
μM micromolar
U unit
ppm parts per million
sec and " second
min and ' minute
hr hour
ETOH ethanol
eq. equivalent
N normal
CI Colour (Color) Index CAS Chemical Abstracts Society
Perhydrolase Enzyme A feature of the present compositions and methods for oxidative dye decolorization is the presence of one or more perhydrolase enzymes.

In some embodiments, the perhydrolase enzyme is naturally-occurring enzyme. In some embodiments, a perhydrolase enzyme comprises, consists of, or consists essentially of an amino acid sequence that is at least about 70%, 75%, 80%, 85%, 90%, 91%, 92%, 93%, 94%, 95%, 96%, 97%, 98%, 99%, or even 99.5% identical to the amino acid sequence of a naturally-occurring perhydrolase enzyme. In some embodiments, the perhydrolase enzyme is from a microbial source, such as a bacterium or fungus.

In some embodiments, the perhydrolase enzyme is a naturally occurring *Mycobacterium smegmatis* perhydrolase enzyme or a variant thereof. This enzyme, its enzymatic properties, its structure, and numerous variants and homologs, thereof, are described in detail in International Patent Application Publications WO 05/056782A and WO 08/063,400A and U.S. Patent Application Publications US2008145353 and US2007167344, which are incorporated by reference.

In some embodiments, a perhydrolase enzyme comprises, consists of, or consists essentially of the amino acid sequence set forth in SEQ ID NO: 1 or a variant or homologue thereof. In some embodiments, the perhydrolase enzyme comprises, consists of, or consists essentially of an amino acid sequence that is at least about 70%, 75%, 80%, 85%, 90%, 91%, 92%, 93%, 94%, 95%, 96%, 97%, 98%, 99%, or even 99.5% identical to the amino acid sequence set forth in SEQ ID NO: 1.

The amino acid sequence of *M. smegmatis* perhydrolase is shown below (SEQ ID NO: 1):

MAKRILCFGDSLTWGWVPVEDGAPTERFAPDVRWTGVLAQQLGADPEVI

EEGLSARTTNIDDPTDPRLNGASYLPSCLATHLPLDLVIIMLGTNDTKA

YFRRTPLDIALGMSVLVTQVLTSAGGVGTTYPAPKVLVVSPPPLAPMPH

PWFQLIFEGGEQKTTELARVYSALASFMKVPFFDAGSVISTDGVDGIHF

TEANNRDLGVALAEQVRSLL

The corresponding polynucleotide sequence encoding *M. smegmatis* perhydrolase is further shown below (SEQ ID NO: 2):

5'-ATGGCCAAGCGAATTCTGTGTTTCGGTGATTCCCTGACCTGGGGCT

GGGTCCCCGTCGAAGACGGGGCACCCACCGAGCGGTTCGCCCCCGACGT

GCGCTGGACCGGTGTGCTGGCCCAGCAGCTCGGAGCGGACTTCGAGGTG

ATCGAGGAGGGACTGAGCGCGCGCACCACCAACATCGACGACCCCACCG

ATCCGCGGCTCAACGGCGCGAGCTACCTGCCGTCGTGCCTCGCGACGCA

CCTGCCGCTCGACCTGGTGATCATCATGCTGGGCACCAACGACACCAAG

GCCTACTTCCGGCGCACCCCGCTCGACATCGCGCTGGGCATGTCGGTGC

TCGTCACGCAGGTGCTCACCAGCGCGGGCGGCGTCGGCACCACGTACCC

GGCACCCAAGGTGCTGGTGGTCTCGCCGCCACCGCTGGCGCCCATGCCG

CACCCCTGGTTCCAGTTGATCTTCGAGGGCGGCGAGCAGAAGACCACTG

AGCTCGCCCGCGTGTACAGCGCGCTCGCGTCGTTCATGAAGGTGCCGTT

CTTCGACGCGGGTTCGGTGATCAGCACCGACGGCGTCGACGGAATCCAC

TTCACCGAGGCCAACAATCGCGATCTCGGGGTGGCCCTCGCGGAACAGG

TGCGGAGCCTGCTGTAA-3'

In some embodiments, the perhydrolase enzyme comprises one or more substitutions at one or more amino acid positions equivalent to position(s) in the *M. smegmatis* perhydrolase amino acid sequence set forth in SEQ ID NO: 1. In some embodiments, the perhydrolase enzyme comprises any one or any combination of substitutions of amino acids selected from M1, K3, R4, I5, L6, C7, D10, S11, L12, T13, W14, W16, G15, V17, P18, V19, D21, G22, A23, P24, T25, E26, R27, F28, A29, P30, D31, V32, R33, W34, T35, G36, L38, Q40, Q41, D45, L42, G43, A44, F46, E47, V48, I49, E50, E51, G52, L53, S54, A55, R56, T57, T58, N59, I60, D61, D62, P63, T64, D65, P66, R67, L68, N69, G70, A71, S72, Y73, S76, C77, L78, A79, T80, L82, P83, L84, D85, L86, V87, N94, D95, T96, K97, Y99F100, R101, R102, P104, L105, D106, I107, A108, L109, G110, M111, S112, V113, L114, V115, T116, Q117, V118, L119, T120, S121, A122, G124, V125, G126, T127, T128, Y129, P146, P148, W149, F150, I153, F154, I194, and F196.

In some embodiments, the perhydrolase enzyme comprises one or more of the following substitutions at one or more amino acid positions equivalent to position(s) in the *M. smegmatis* perhydrolase amino acid sequence set forth in SEQ ID NO: 1: L12C, Q, or G; T25S, G, or P; L53H, Q, G, or S; S54V, L A, P, T, or R; A55G or T; R67T, Q, N, G, E, L, or F; K97R; V125S, G, R, A, or P; F154Y; F196G.

In some embodiments, the perhydrolase enzyme comprises a combination of amino acid substitutions at amino acid positions equivalent to amino acid positions in the *M. smegmatis* perhydrolase amino acid sequence set forth in SEQ ID NO: 1: L12I S54V; L12M S54T; L12T S54V; L12Q T25S S54V; L53H S54V; S54P V125R; S54V V125G; S54V F196G; S54V K97R V125G; or A55G R67T K97R V125G.

In particular embodiments, the perhydrolase enzyme is the S54V variant of the *M. smegmatis* perhydrolase, which is shown, below (SEQ ID NO: 3; S54V substitution underlined):

MAKRILCFGDSLTWGWVPVEDGAPTERFAPDVRWTGVLAQQLGADPEVI

EEGL<u>V</u>ARTTNIDDPTDPRLNGASYLPSCLATHLPLDLVIIMLGTNDTKA

YFRRTPLDIALGMSVLVTQVLTSAGGVGTTYPAPKVLVVSPPPLAPMPH

PWFQLIFEGGEQKTTELARVYSALASFMKVPFFDAGSVISTDGVDGIHF

TEANNRDLGVALAEQVRSLL

In some embodiments, the perhydrolase enzyme includes the S54V substitution but is otherwise at least about 70%, 75%, 80%, 85%, 90%, 91%, 92%, 93%, 94%, 95%, 96%, 97%, 98%, 99%, or even 99.5% identical to the amino acid sequence set forth in SEQ ID NOs: 1 or 3.

In some embodiments, the perhydrolase enzyme has a perhydrolysis:hydrolysis ratio of at least 1. In some embodiments, a perhydrolase enzyme has a perhydrolysis:hydrolysis ratio greater than 1.

In some embodiments, the perhydrolase enzyme is provided at a molar ratio with respect to the amount of dye to be decolorized. In some embodiments, the molar ratio is from about 1/10,000 to about 1/100, or even from about 1/5,000 to about 1/100.

In some embodiments, the concentration of perhydrolase enzyme present in the aqueous medium during dye decolorization is from about $10^{-9}$ M to about $10^{-5}$ M, from about $10^{-8}$ M to about $10^{-5}$ M, from about $10^{-8}$ M to about $10^{-6}$ M, about $5\times10^{-8}$ M to about $5\times10^{-7}$ M, or even about $10^{-7}$ M to about $5\times10^{-7}$ M, for example, about $1.7\times10^{-7}$ to about $3.4\times10^{-7}$ M. In particular embodiments, about 0.2 µM to about 0.5 µM perhydrolase enzyme is used to decolorize aqueous medium comprising about 34 µM dye.

In some embodiments, the amount of perhydrolase enzyme is below a predetermined amount to improve the efficiency of decolorization. It is believed that an excess of enzyme produces unwanted side reactions, including the destruction of enzymatically-generated peracids, and that dye decolorization occurs most efficiently under certain conditions. Accordingly, in some embodiments, the concentration of perhydrolase enzyme present in the aqueous medium during dye decolorization is less about $10^{-6}$ M, less about $5\times10^{-7}$ M, or even less than about $10^{-7}$ M. In particular embodiments, the concentration of perhydrolase enzyme present in the aqueous medium during dye decolorization is less than about $3.4\times10^{-7}$ M, or even less than about $1.7\times10^{-7}$ M. Such values generally refer to a dye concentration of about 34 µM, and can be adjusted depending on the actual concentration of dye in the aqueous medium.

While the absolute amount of perhydrolase enzyme use in a decolorization reaction can be increased or decreased depending on the amount of dye to be decolorized, it is generally believed that longer incubation times, rather than a higher concentration of enzyme, are preferred for decolorizing an increased amount of dye.

Ester Substrate

Another feature of the present compositions and methods for oxidative dye decolorization is the presence of an ester molecule that serves as a substrate for the perhydrolase enzyme for production of a peracid in the presence of hydrogen peroxide.

In some embodiments, the ester substrate is an ester of an aliphatic and/or aromatic carboxylic acid or alcohol. The ester substrate may be a mono-, di-, or multivalent ester, or a mixture thereof. For example, the ester substrate may be a carboxylic acid and a single alcohol (monovalent, e.g., ethyl acetate, propyl acetate), two carboxylic acids and a diol [e.g., propylene glycol diacetate (PGDA), ethylene glycol diacetate (EGDA), or a mixture, for example, 2-acetyloxy 1-propionate, where propylene glycol has an acetate ester on alcohol group 2 and a propyl ester on alcohol group 1], or three carboxylic acids and a triol (e.g., glycerol triacetate or a mixture of acetate/propionate, etc., attached to glycerol or another multivalent alcohol). In some embodiments, the ester substrate is an ester of a nitroalcohol (e.g., 2-nitro-1-propanol). In some embodiments, the ester substrate is a polymeric ester, for example, a partially acylated (acetylated, propionylated, etc.) poly carboxy alcohol, acetylated starch, etc. In some embodiments, the ester substrate is an ester of one or more of the following: formic acid, acetic acid, propionic acid, butyric acid, valeric acid, caproic acid, caprylic acid, nonanoic acid, decanoic acid, dodecanoic acid, myristic acid, palmitic acid, stearic acid, and oleic acid. In some embodiments, triacetin, tributyrin, and other esters serve as acyl donors for peracid formation. In some embodiments, the ester substrate is propylene glycol diacetate, ethylene glycol diacetate, or ethyl acetate. In one embodiment, the ester substrate is propylene glycol diacetate.

As noted above, suitable substrates may be monovalent (i.e., comprising a single carboxylic acid ester moiety) or plurivalent (i.e., comprising more than one carboxylic acid ester moiety). The amount of substrate used for oxidative decolorization may be adjusted depending on the number carboxylic acid ester moieties in the substrate molecule. In some embodiments, the concentration of carboxylic acid ester moieties in the aqueous medium is about 20-500 mM, for example, about 40 mM to about 400 mM, about 40 mM to about 200 mM, or even about 60 mM to about 200 mM. Exemplary concentrations of carboxylic acid ester moieties include about 60 mM, about 80 mM, about 100 mM, about 120 mM, about 140 mM, about 160 mM, about 180 mM, and about 200 mM. Such amounts of substrate are suitable for use in a decolorizing reaction in which the concentration of dye is about 34 µM, and can be adjusted for the decolorization of more or less dye.

In some embodiments, where the ester substrate is divalent (as in the case of EGDA) it is provided in an amount of about 10-200 mM in the aqueous medium to be decolorized, for example, about 20 mM to about 200 mM, about 20 mM to about 100 mM, or even about 30 mM to about 100 mM. Exemplary amounts of ester substrate include about 30 mM, about 40 mM, about 50 mM, about 60 mM, about 70 mM, about 80 mM, about 90 mM, and about 100 mM. As before, these amounts of substrate are suitable for use in a decolorizing reaction in which the concentration of dye is about 34 µM, and can be adjusted for the decolorization of more or less dye. The skilled person can readily calculate the corresponding amounts of trivalent, or other plurivalent ester substrates based on the number of carboxylic acid esters moieties per molecule.

In some embodiments, the ester substrate is provided in a molar excess with respect to the molar amount of dye to be decolorized. In some embodiments, the carboxylic acid ester moieties of the ester substrate are provided at about 20 to about 20,000 times the molar amount of dye. Exemplary molar ratios of carboxylic acid ester moieties to dye molecules are from about 100/1 to about 10,000/1, from about 1,000/1 to about 10,000/1, or even 2,000/1 to about 6,000/1. In some cases, the molar ratio of ester substrate to dye molecules is at least 2,000/1, or at least 6,000/1.

In some embodiments, where the ester substrate is divalent (as in the case of EGDA) the ester substrate is provided at about 10 to about 10,000 times the molar amount of dye. Exemplary molar ratios of ester substrate to dye molecules are from about 50/1 to about 5,000/1, from about 500/1 to about 5,000/1, or even 1,000/1 to about 3,000/1. In some cases, the molar ratio of ester substrate to dye molecules is at least 1,000/1, or at least 3,000/1. As before, the skilled person can readily calculate the corresponding amounts of trivalent, or other plurivalent ester substrates based on the number of carboxylic acid esters moieties per molecule.

In some embodiments, the ester substrate is provided in a molar excess with respect to the perhydrolase enzyme. In some embodiments, the molar ratio of carboxylic acid ester moieties to perhydrolase enzyme is at least about $2\times10^5/1$, at least about $4\times10^5/1$, at least about $1\times10^6/1$, at least about $2\times10^6/1$, at least about $4\times10^6/1$, or even at least about $1\times10^7/1$, or more. In some embodiments, the ester substrate is provided in a molar excess of from about $4\times10^5/1$, to about $4\times10^6/1$, with respect to the perhydrolase enzyme.

In some embodiments, where the ester substrate is divalent (as in the case of EGDA), the molar ratio of ester substrate to perhydrolase enzyme is at least about $1\times10^5/1$, at least about $2\times10^5/1$, at least about $5\times10^5/1$, at least about $1\times10^6/1$, at least about $2\times10^6/1$, or even at least about $5\times10^6/1$, or more. In some embodiments, the ester substrate is provided in a molar excess of from about $2\times10^5/1$ to about $2\times10^6/1$, with respect to the perhydrolase enzyme. The skilled person can readily calculate the corresponding amounts of trivalent, or other plurivalent ester substrates based on the number of carboxylic acid esters moieties per molecule.

Hydrogen Peroxide Source

Another feature of the present compositions and methods for oxidative dye decolorization is the presence of a hydrogen peroxide source. Generally, hydrogen peroxide can be provided directly (i.e., in batch), or generated continuously (i.e., in situ) by chemical, electro-chemical, and/or enzymatic means.

In some embodiments, the hydrogen peroxide source is hydrogen peroxide, itself. In some embodiments, the hydrogen peroxide source is a compound that generates hydrogen peroxide upon addition to water. The compound may be a solid compound. Such compounds include adducts of hydrogen peroxide with various inorganic or organic compounds, of which the most widely employed is sodium carbonate per hydrate, also referred to as sodium percarbonate.

In some embodiments, the hydrogen peroxide source is an inorganic perhydrate salt. Examples of inorganic perhydrate salts are perborate, percarbonate, perphosphate, persulfate and persilicate salts. Inorganic perhydrate salts are normally alkali metal salts.

Additional hydrogen peroxide sources include adducts of hydrogen peroxide with zeolites, or urea hydrogen peroxide.

The hydrogen peroxide source may be in a crystalline form and/or substantially pure solid form without additional protection. For certain perhydrate salts, preferred forms are granular compositions involving a coating, which provides better storage stability for the perhydrate salt in the granular product. Suitable coatings comprise inorganic salts such as alkali metal silicate, carbonate or borate salts or mixtures thereof, or organic materials such as waxes, oils, or fatty soaps.

In some embodiments, the hydrogen peroxide source is an enzymatic hydrogen peroxide generation system. In one embodiment, the enzymatic hydrogen peroxide generation system comprises an oxidase and its substrate. Suitable oxidase enzymes include, but are not limited to: glucose oxidase, sorbitol oxidase, hexose oxidase, choline oxidase, alcohol oxidase, glycerol oxidase, cholesterol oxidase, pyranose oxidase, carboxyalcohol oxidase, L-amino acid oxidase, glycine oxidase, pyruvate oxidase, glutamate oxidase, sarcosine oxidase, lysine oxidase, lactate oxidase, vanillyl oxidase, glycolate oxidase, galactose oxidase, uricase, oxalate oxidase, and xanthine oxidase.

The following equation provides an example of a coupled system for enzymatic production of hydrogen peroxide.

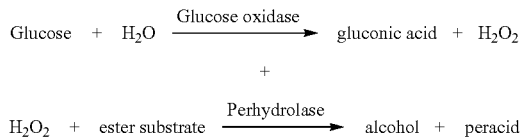

It is not intended that the generation of $H_2O_2$ be limited to any specific enzyme, as any enzyme that generates $H_2O_2$ with a suitable substrate may be used. For example, lactate oxidases from *Lactobacillus* species known to create $H_2O_2$ from lactic acid and oxygen may be used. One advantage of such a reaction is the enzymatic generation of acid (e.g., gluconic acid in the above example), which reduces the pH of a basic aqueous solution to within the pH range in which peracid is most effective in bleaching (i.e., at or below the pKa). Such a reduction in pH is also brought about directly by the production of peracid. Other enzymes (e.g., alcohol oxidase, ethylene glycol oxidase, glycerol oxidase, amino acid oxidase, etc.) that are capable of generating hydrogen peroxide may also be used with ester substrates in combination with a perhydrolase enzyme to generate peracids.

Where hydrogen peroxide is generated electrochemically, it may be produced, for example, using a fuel cell supplied with oxygen and hydrogen gas.

In some embodiments, the ester substrate is provided in an amount of about 10-200 mM in the aqueous medium to be decolorized, for example, about 20 mM to about 200 mM, about 20 mM to about 100 mM, or even about 30 mM to about 100 mM. Exemplary amounts of ester substrate include about 30 mM, about 40 mM, about 50 mM, about 60 mM, about 70 mM, about 80 mM, about 90 mM, and about 100 mM. These amounts of hydrogen peroxide are suitable for use in a decolorizing reaction in which the concentration of dye is about 34 µM, and can be adjusted for the decolorization of more or less dye.

In some embodiments, hydrogen peroxide is provided in a molar excess with respect to the molar amount of dye to be decolorized. In some embodiments, the hydrogen peroxide is provided at about 10 to about 10,000 times the molar amount of dye. Exemplary molar ratios of hydrogen peroxide to dye molecules are from about 500/1 to about 5,000/1, or even 1,000/1 to about 3,000/1. In some cases, the molar ratio of hydrogen peroxide to dye molecules is at least 1,000/1, or at least 3,000/1.

In some embodiments, the hydrogen peroxide is provided in a molar excess with respect to the perhydrolase enzyme. In some embodiments, the molar ratio of hydrogen peroxide to perhydrolase enzyme is at least about $1\times10^5/1$, at least about $2\times10^5/1$, at least about $5\times10^5/1$, at least about $1\times10^6/1$, at least about $2\times10^6/1$, or even at least about $5\times10^6/1$, or more. In some embodiments, the hydrogen peroxide is provided in a molar excess of about $2\times10^5/1$ to $2\times10^6/1$, with respect to the perhydrolase enzyme.

It may in some circumstances be desirable to add catalase to the final treated aqueous medium to destroy residual hydrogen peroxide.

Dyes

Any dye that may be oxidatively decolorized by a peracid may be treated with the methods described herein. Examples of dyes that may be oxidatively decolorized according to the methods described herein include, but are not limited to, azo, monoazo, disazo, nitro, xanthene, quinoline, anthroquinone, triarylmethane, paraazoanyline, azineoxazine, stilbene, aniline, and phthalocyanine dyes, or mixtures thereof. In one embodiment, the dye is an azo dye (e.g., Reactive Black 5 (2,7-naphthalenedisulfonic acid, 4-amino-5-hydroxy-3,6-bis ((4-((2-(sulfooxy)ethyl)sulfonyl)phenyl)azo)-tetrasodium salt), Reactive Violet 5, methyl yellow, Congo red). In some embodiments, the dye is an anthraquinone dye (e.g., remazol blue), indigo (indigo carmine), a triarylmethane/paraazoanyline dye (e.g., crystal violet, malachite green), or a sulphur-based dye. In various embodiments, the dye is a reactive, direct, disperse, or pigment dye. In some embodiments, the dye is a component of an ink. In some embodiments, the dye is a molecule suitable for imparting color to a textile.

One class of dyes that may be oxidatively decolorized using enzymatically generated peracid is the reactive dyes. Reactive dyes are chromophores that include an activated or activatable functional group capable of chemically interacting with the surface of an object to be dyed, such as a textile surface. Such interaction may take the form of a covalent bond. Exemplary functional groups include monochlorotriazine, monofluorochlorotriazine, dichlorotriazine, difluorochloropyrimidine, dichloroquinoxaline, trichloropyrimidine, vinyl amide, vinyl sulfone, and the like. Reactive dyes may have more than one functional group (e.g., bifunctional reactive dyes), thereby enabling a higher degree of fixation to a fabric.

Exemplary reactive dyes are listed in the Table 1, where C.I.=Colour Index according to the Society of Dyers and Colourists (UK) and American Association of Textile Chemists and Colorists (USA) and CAS=Chemical Abstracts Society.

TABLE 1

Exemplary reactive dyes

| CI NAME | CI NO. | CAS NO. |
|---|---|---|
| Reactive Yellow 15 | 11859 | 12226-47-0 |
| Reactive Yellow 17 | 18852 | 20317-19-5 |
| Reactive Yellow 24 | — | 12226-51-6 |
| Reactive Yellow 37 | — | — |
| Reactive Yellow 42 | — | 12226-63-0 |
| Reactive Yellow 57 | — | — |
| Reactive Yellow 77 | — | 85854-36-0 |
| Reactive Yellow 107 | — | — |
| Reactive Yellow 186 | — | — |
| Reactive Orange 16 | 17757 | 12225-88-6 |
| Reactive Orange 16a | — | — |
| Reactive Orange 78 | — | — |
| Reactive Orange 82 | — | — |
| Reactive Red 21 | — | — |
| Reactive Red 35 | — | — |
| Reactive Red 49 | — | — |
| Reactive Red 106 | — | 105635-66-3 |
| Reactive Red 174 | — | — |
| Reactive Red 180a | — | — |
| Reactive Red 198 A | — | — |
| Reactive Violet 5 | 18097 | 12226-38-9 |
| Reactive Blue 19 | 61200 | 2580-78-1 |
| Reactive Blue 19 | — | — |
| Reactive Blue 21 | — | 12236-86-1 |
| Reactive Blue 28 | — | 12225-45-5 |
| Reactive Blue 89 | — | — |
| Reactive Blue 203 | — | 147826-71-9 |
| Reactive Blue 220 | — | — |
| Reactive Blue 221 | — | — |
| Reactive Green 38 | — | — |
| Reactive Brown 18 | — | 12225-73-9 |
| Reactive Black 5 | 20505 | 2225-25-1 |
| Reactive Black 31 | — | 12731-63-4 |

Dye can be present at a wide range of concentrations, and more than one dye can be present in aqueous medium. In many cases, particularly where the concentration of dye falls within a known range, the exact concentration of dye is not critical and need not be calculated or determined prior to decolorization. The appended examples generally use a dye concentration of about $3.5 \times 10^{-5}$ M but the amount of dye can readily be at least an order of magnitude higher, or lower. In some embodiments, it may be desirable to adjust the concentration of ester substrate and hydrogen peroxide such that they are proportional to the amount of dye to be decolorized (molar ratios are provided herein). In some embodiments, it may be desirable to adjust the concentration of perhydrolase enzyme such that it is proportional to the amount of dye to be decolorized, although the amount of enzyme is generally believed to be less critical. Longer incubation times may be required to decolorize an increased amount of dye, particularly when the concentration of dye is not increases proportionally to match the amount of dye.

Methods

In one aspect, methods for oxidative decolorization of a dye in aqueous medium are provided. An exemplary aqueous medium is wastewater effluent containing a dye, such as effluent from a textile process or pulp/paper process. Generally, the methods include contacting an aqueous medium containing a dye with an enzymatically generated peracid.

In some embodiments, the dye is contacted with a composition containing a perhydrolase enzyme, a substrate for the perhydrolase enzyme, and a hydrogen peroxide source, wherein catalytic action of the perhydrolase enzyme on the substrate in the presence of hydrogen peroxide produces a peracid. The dye is contacted with the composition for a length of time and under conditions suitable to produce an amount of the peracid that is sufficient to decolorize at least a portion of the dye.

In some embodiments, e.g., for decolorization of a dye in a wastewater effluent, the method is conducted at a pH of about 6 to about 11, about 9 to about 11, or about 9 to about 10. In some embodiments, the method is conducted at a temperature of about 20° to about 70° C., about 40° to about 70° C., about 40° to about 50° C., or about 40° to about 45° C. In some embodiments, the method is conducted for at least about 30, 60, 90, or 120 minutes. \

In some embodiments, the decolorization method is performed using preselected amounts of perhydrolase enzyme, ester substrate, and hydrogen peroxide to provide a substantial amount of decolorization, e.g., at least about 30%, at least about 40%, at least about 50%, at least about 60%, at least about 70%, at least about 80%, or even at least about 90%, relative to the amount of dye (color) prior to decolorization. The amount of decolorization can be determined by comparing the amount of color present in the original aqueous medium to the amount of color present in the residual aqueous medium following treatment as described.

In some embodiments, the amount of decolorization obtained using the described method is at least 1.5-fold, at least 2-fold, at least 2.5-fold, or even at least 3-fold of the amount of decolorization achieved using an equivalent method that lacks a perhydrolase enzyme.

Preferred amounts of perhydrolase enzyme, ester substrate, and hydrogen peroxide are described herein.

Compositions and Kits of Parts

In another aspect, compositions for use in an oxidative dye decolorization method are provided. The composition comprises a perhydrolase enzyme, a substrate for the perhydrolase enzyme, and a hydrogen peroxide source, in amounts and in ratios suitable for decolorization of a dye in aqueous medium. Preferred amounts of perhydrolase enzyme, ester substrate, and hydrogen peroxide are described herein.

The perhydrolase enzyme, substrate for the perhydrolase enzyme, and hydrogen peroxide source may be provided as discrete components for combination prior to addition to an aqueous medium containing dye for decolorization. Alternatively, the perhydrolase enzyme, substrate for the perhydrolase enzyme, and hydrogen peroxide source may be added separately to an aqueous medium containing dye for decolorization, thereby producing the described decolorization composition in situ. As a further alternative, the perhydrolase enzyme, substrate for the perhydrolase enzyme, and hydrogen peroxide source may be provided in a single container, or single formulation, for addition to an aqueous medium containing dye for decolorization.

In a related aspect, a kit of parts (i.e., kit) is provided, which embodies the present compositions in a format that is convenient for the end user. In some embodiments, the kit provides a perhydrolase enzyme, substrate for the perhydrolase enzyme, and hydrogen peroxide, with instructions for use of the perhydrolase enzyme in an oxidative dye decolorization method as described herein. Suitable packaging and instructions are provided. The instructions may be provided in printed form or in the form of an electronic medium such as a floppy disc, CD, or DVD, or in the form of a website address where such instructions may be obtained.

These and other aspects and embodiments of the present compositions and method will be apparent to the skilled person in view of the present description. The following examples are intended to further illustrate, but not limit, the compositions and methods.

EXAMPLES

Example 1

Decolorization of Dyes in Aqueous Solution

Materials

The S54V variant of *M. smegmatis* perhydrolase (SEQ ID NO: 3) was used as the exemplary perhydrolase enzyme. This enzyme is elsewhere referred to as an arylesterase (ArE) or acetyl transferase (AcT) (see, e.g., WO 05/056782A, WO 08/063,400A, US2008145353, and US2007167344). The enzyme was diluted from a concentration of 16 mg/ml into 50 mM sodium acetate buffer, pH 5.0. 100 mM sodium carbonate, pH 10.3, was used as the buffer for enzymatic reactions. Commercial grade hydrogen peroxide ($H_2O_2$; 50% wt/wt), ethylene glycol diacetate (EGDA), Reactive Black 5 (55% dye content), and Remazol Brilliant Violet 5 R, were purchased from Sigma-Aldrich. Stock solutions of $H_2O_2$ and dyes were prepared by dilution into deionized water. EGDA was dissolved in 50% ethanol (v/v).

Dye Oxidation

Experimental samples were prepared in 15 ml Falcon tubes. Each sample of 4 ml contained sodium carbonate buffer and a sufficient amount of the stock solutions of dye, EGDA, and enzyme to achieve the desired concentrations. Dye oxidation experiments were performed by transferring the experimental samples to 96-well plates (typically one row of wells per experimental condition). Typical 200 µl samples contained $3.4 \times 10^{-5}$ M dye, $3.4 \times 10^{-2}$ M EGDA, and $3.4 \times 10^{-7}$ M enzyme. The concentration of dye was kept low to prevent aggregation. 20 µl of $H_2O_2$ was added with a multichannel pipette to a row of wells and the absorbance was recorded at an appropriate wavelength (590 nm for Reactive Black 5; 325 nm and 560 nm for Reactive Violet 5R) for 90 or 120 minutes. Reactions were performed at room temperature unless otherwise indicated.

Oxidative Decolorization of Reactive Black 5

Experimental samples were prepared as described in Table 2.

samples contained no enzyme (i.e., "1000/0/1000") or no EGDA and no enzyme (i.e., "0/0/1000"). The effect of $H_2O_2$ alone (i.e., "0/0/1000") on decolorization was minimal under these conditions. Some decolorization was observed with EGDA in the absence of enzyme (i.e., 1000/0/1000). It is possible that the combination of EGDA and $H_2O_2$ in basic medium generated a small amount of peracetic acid that was capable of decolorization at a faster rate than peroxide alone. Significantly more decolorization was observed in the presence of EGDA and enzyme (i.e., "1000/0/1000"), demonstrating the benefits of the perhydrolase enzyme.

Figure 2:
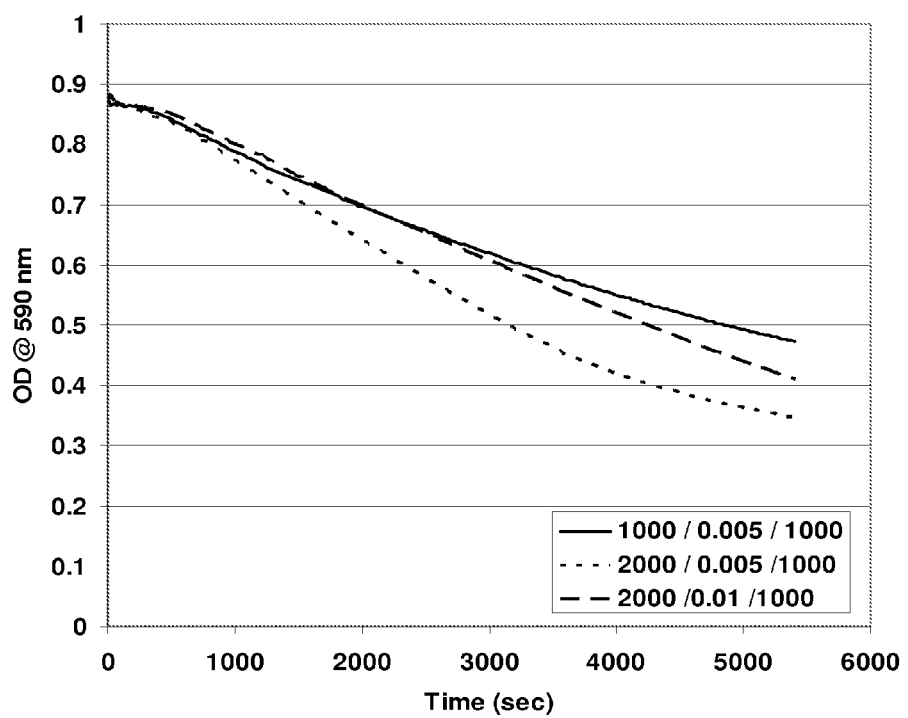
FIG. 2 is a graph showing oxidative decolorization of Reactive Black 5 at room temperature using different ratios of EGDA, enzyme, and hydrogen peroxide.

FIG. 2 is a graph showing the effect of changing the ratio of EGDA to enzyme and changing the amount of enzyme. Decolorization was favored at a higher ratio of EGDA to enzyme (i.e., "2000/0.005/1000" compared to "1000/0.005/1000"). Decolorization was also favored by the presence of additional enzyme (i.e., "2000/0.01/1000" compared to "2000/0.005/1000"), although the linearity of the decolorization curve was improved using a reduced amount of enzyme.

Figure 3:
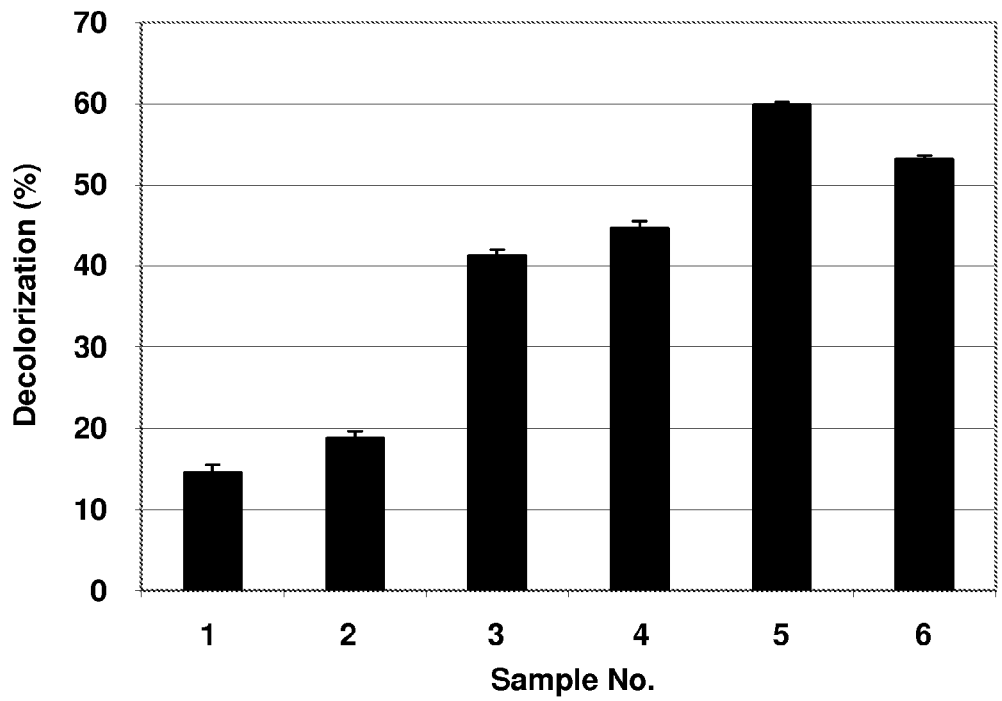
FIG. 3 is a graph showing the percentage of Reactive Black 5 decolorization at room temperature.

FIG. 3 is a graph showing the percentage of decolorization observed using each of the experimental samples identified in Table 2. Increased decolorization was observed using a higher EGDA/enzyme ratio (i.e., sample 5 compared to sample 3). The use of an additional amount of enzyme increased the decolorization rate in combination with the higher concentration of EGDA (i.e., sample 5 compared to sample 6) but not the lower concentration of EGDA (i.e., sample 3 compared to sample 4). Overall, the present compositions and methods were capable of producing an at least a three-fold increase in decolorization compared to the controls (up to about 60%).

TABLE 2

| | Sample | | | | | |
|---|---|---|---|---|---|---|
| | 1 | 2 | 3 | 4 | 5 | 6 |
| Dye (M) | $3.4 \times 10^{-5}$ | $3.4 \times 10^{-5}$ | $3.4 \times 10^{-5}$ | $3.4 \times 10^{-5}$ | $3.4 \times 10^{-5}$ | $3.4 \times 10^{-5}$ |
| EGDA (M) | 0 | 0.0340 | 0.0340 | 0.0340 | 0.0680 | 0.0680 |
| Enzyme (M) | 0 | 0 | $3.4 \times 10^{-7}$ | $1.7 \times 10^{-7}$ | $3.4 \times 10^{-7}$ | $1.7 \times 10^{-7}$ |
| $H_2O_2$ (M) | 0.0340 | 0.0340 | 0.0340 | 0.0340 | 0.0340 | 0.0340 |

FIG. 1 is a graph showing the effect of EGDA alone and EGDA with perhydrolase enzyme. The data series labels indicate the relative amounts of EGDA/enzyme/dye. A 1000-fold excess of EGDA and $H_2O_2$ was included relative to the amount of dye, indicated as "1000/0.01/1000". Control Effect of Substrate/Enzyme/Peroxide Ratio on Decolorization of Reactive Black 5

The effect of changing the ratio of substrate:enzyme:peroxide on oxidative decolorization of Reactive Black 5 was investigated. Samples were prepared as described in Table 3.

TABLE 3

| | Sample | | | | | |
|---|---|---|---|---|---|---|
| | 1 | 2 | 3 | 4 | 5 | 6 |
| Dye (M) | $3.4 \times 10^{-5}$ | $3.4 \times 10^{-5}$ | $3.4 \times 10^{-5}$ | $3.4 \times 10^{-5}$ | $3.4 \times 10^{-5}$ | $3.4 \times 10^{-5}$ |
| EGDA (M) | 0 | 0.0340 | 0.0340 | 0.0680 | 0.0680 | 0.0340 |
| Enzyme (M) | 0 | $3.4 \times 10^{-7}$ | $1.7 \times 10^{-6}$ | $3.4 \times 10^{-7}$ | $1.7 \times 10^{-6}$ | $3.4 \times 10^{-7}$ |
| $H_2O_2$ (M) | 0.0340 | 0.0340 | 0.0340 | 0.0340 | 0.0340 | 0.0680 |

Figure 4:
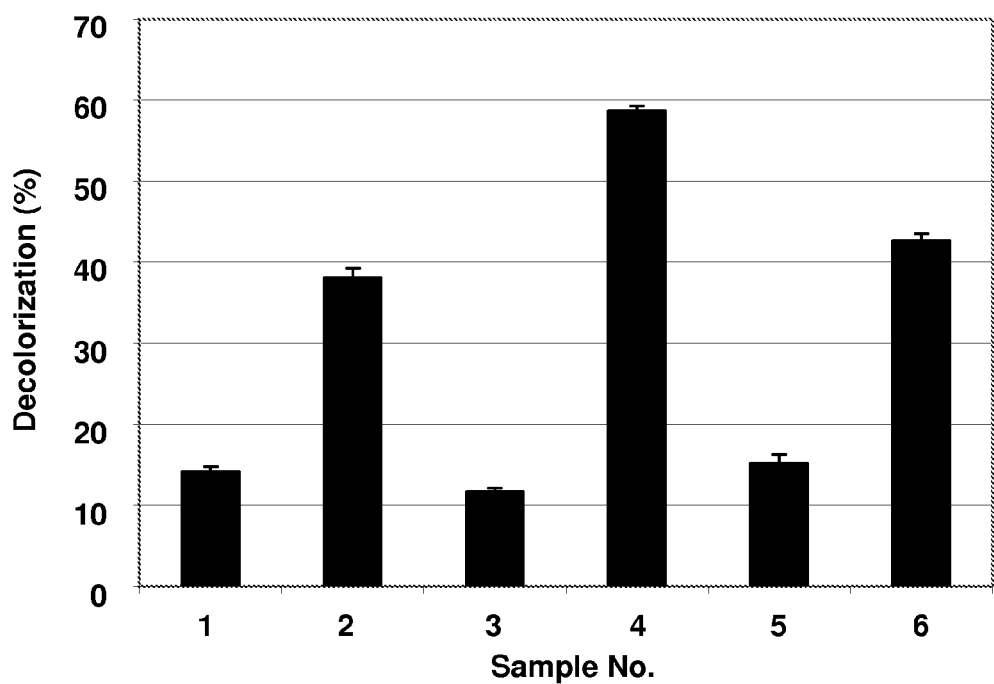
FIG. 4 is a graph showing the percentages of Reactive Black 5 decolorization at room temperature with different with different EGDA/enzyme/$H_2O_2$ ratios.
Figure 5A:
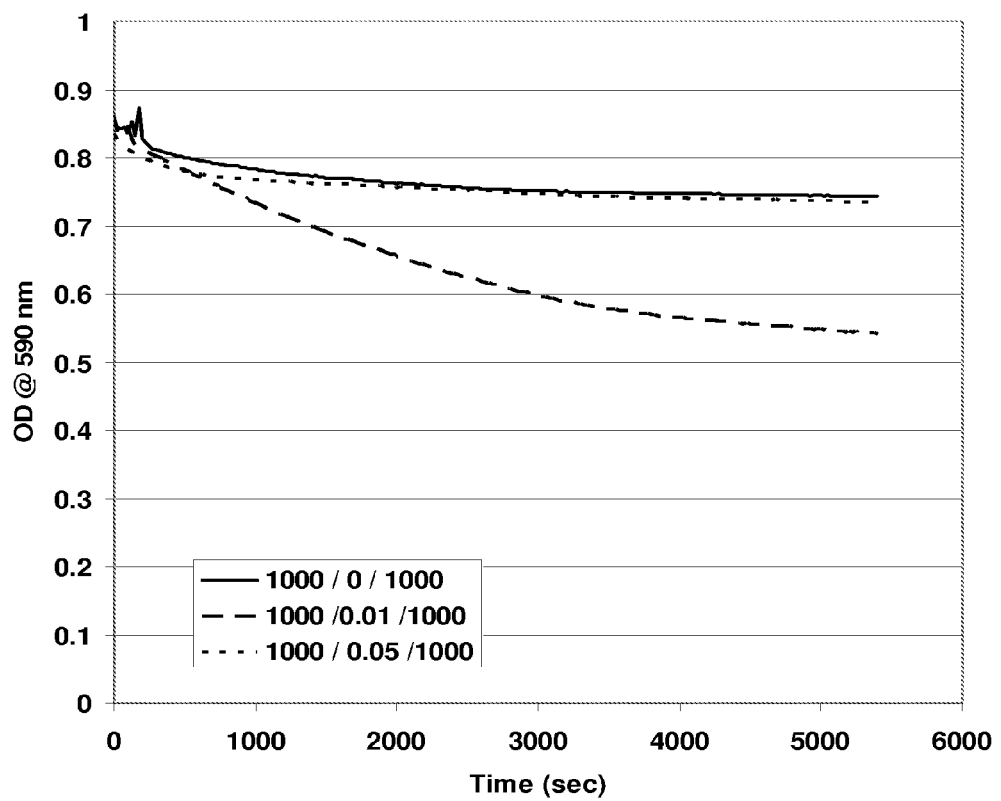
FIGS. 5A and 5B are graphs showing the effect of changes in enzyme and $H_2O_2$ ratios on rate of decolorization of Reactive Black 5 at room temperature.
Figure 5B:
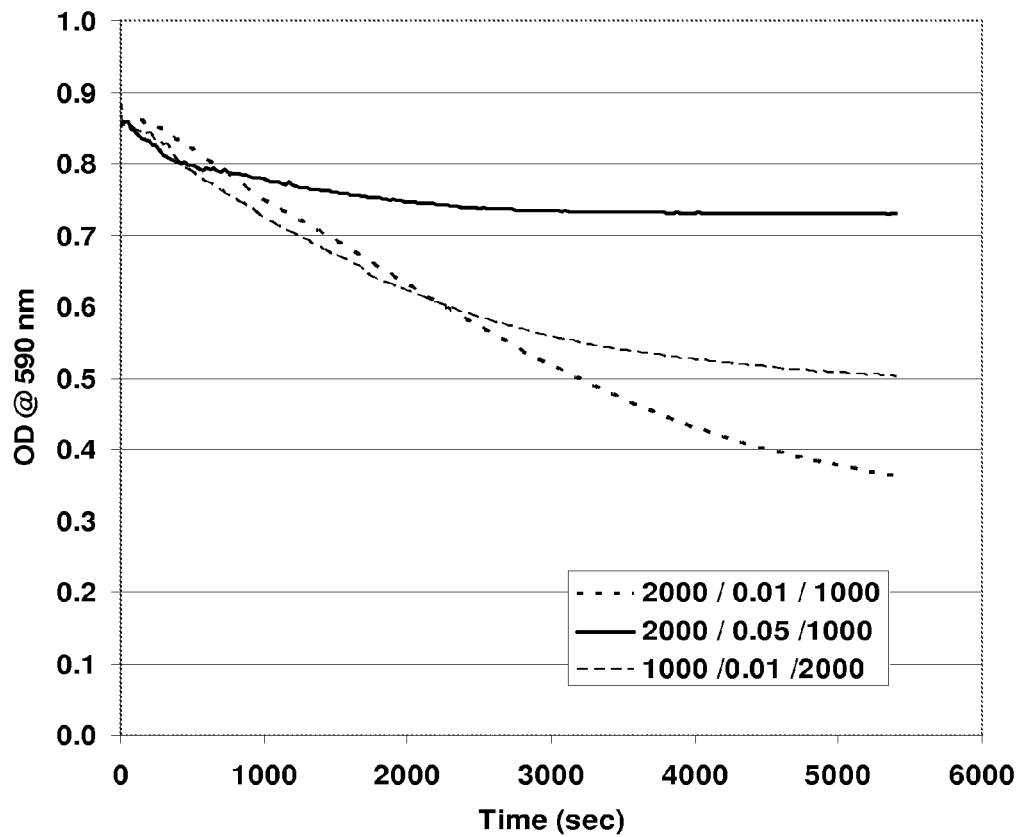

The graphs in FIGS. 4, 5A, and 5B show the effects of adding an excess of enzyme, corresponding to about 5-fold more than used above. Using an excess of enzyme decreased the decolorization rate (i.e., FIG. 4, samples 3 and 5 compared to samples 4 and 6; FIG. 5A, "1000/0.05/1000" compared to "1000/0.01/1000"), again suggesting an optimum range for the enzyme amount. As before, decolorization was favored at a higher ratio of EGDA to enzyme (i.e., "2000/0.01/1000" compared to "1000/0.01/1000"; FIG. 5B).

Effect of Temperature on Decolorization of Reactive Black 5

The effect of increasing the temperature from a nominal 23-25° C. (room temperature) to 40° C. and 45° C. on the oxidative decolorization of Reactive Black 5 was investigated. The amount of EGDA was changed to 1500 to 3000 times the molar amount of dye. Samples were prepared as described in Table 4.

TABLE 4

| | Sample | | | | | |
|---|---|---|---|---|---|---|
| | 1 | 2 | 3 | 4 | 5 | 6 |
| Dye (M) | $3.4 \times 10^{-5}$ | $3.4 \times 10^{-5}$ | $3.4 \times 10^{-5}$ | $3.4 \times 10^{-5}$ | $3.4 \times 10^{-5}$ | $3.4 \times 10^{-5}$ |
| EGDA (M) | 0 | 0.0510 | 0.0510 | 0.1020 | 0.1020 | 0.0510 |
| Enzyme (M) | 0 | 0 | $1.7 \times 10^{-7}$ | $8.5 \times 10^{-8}$ | $1.7 \times 10^{-7}$ | $8.5 \times 10^{-8}$ |
| $H_2O_2$ (M) | 0.0340 | 0.0340 | 0.0340 | 0.0340 | 0.0340 | 0.0340 |

Figure 6:
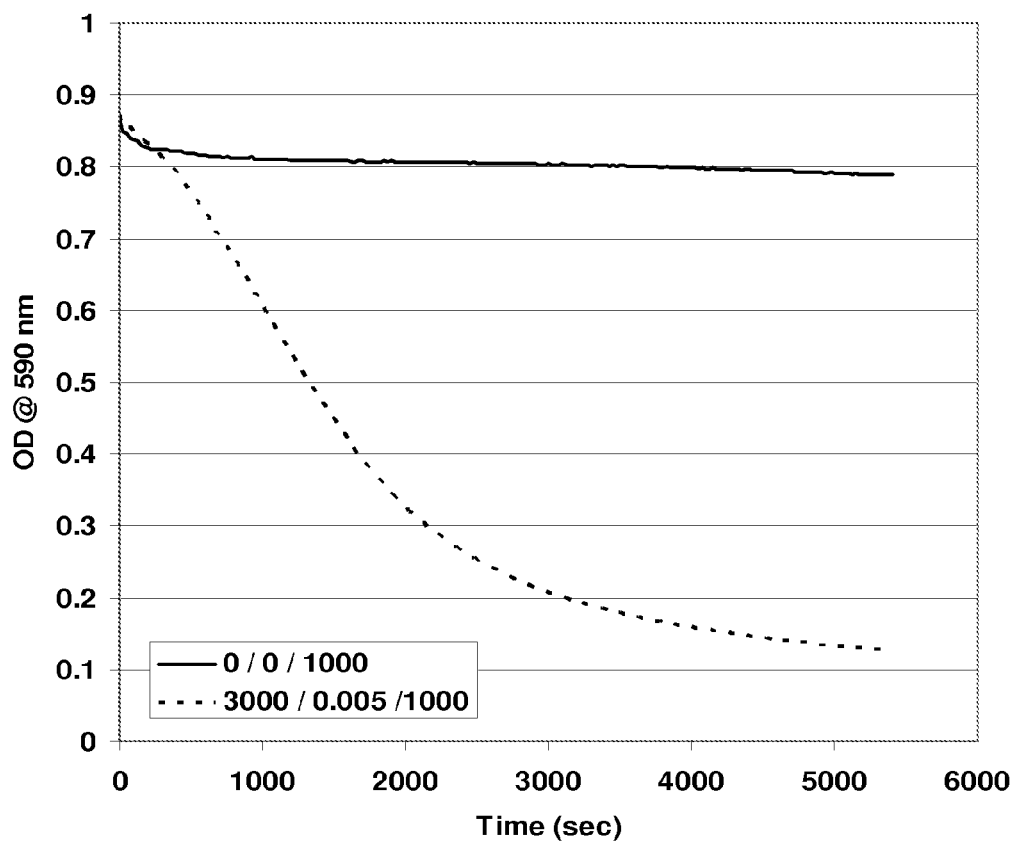
FIG. 6 is a graph showing the effect of increasing the temperature to 40° C. on rate of oxidative decolorization of Reactive Black 5.

The graph in FIG. 6 shows the effect of increasing the temperature to 40° C. The increase in temperature produced a faster decolorization rate. A depletion of about 80% of the initial absorbance was observed for the sample containing EGDA/enzyme/$H_2O_2$ at a ratio of 3000/0.005/1000 after 1 hour at 40° C. In comparison, little decolorization was observed in the control.

Figure 7A:
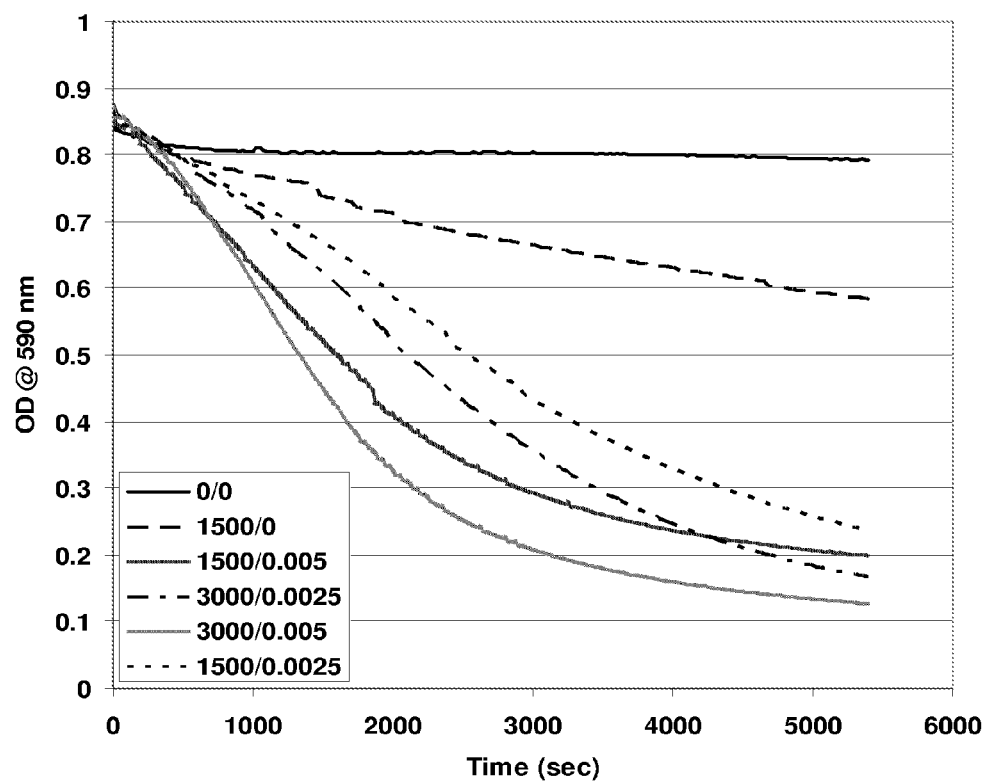
FIGS. 7A and 7B are graphs showing the effect of increasing the temperature to 40° C. and 45° C., respectively, on decolorization of Reactive Black 5 at different ratios of EGDA and enzyme.
Figure 7B:
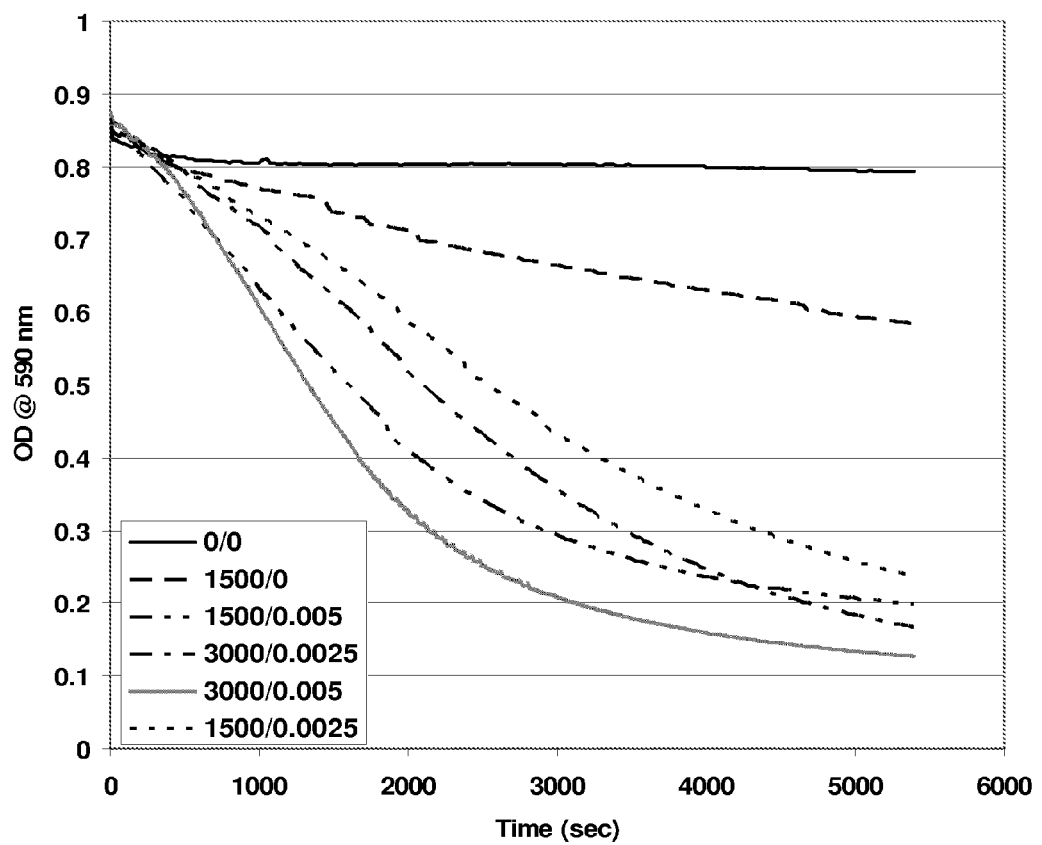

FIGS. 7A and 7B show the effects of temperature (40° C. and 45° C., respectively) on decolorization at different EGDA/enzyme ratios, as indicated by the data series labels. The molar ratio of $H_2O_2$/dye was held constant at 1000. As before, increasing the amount of EGDA increased the rate of decolorization. The absorbance minima, at which the system shows negligible rate of decolorization (plateau at minimum absorbance), was reached faster at higher enzyme concentration. The use of lower enzyme concentrations appeared to produce a lower residual color minima, which was achieved after a longer incubation period. This effect was accentuated at higher temperature. It is postulated that lower enzyme concentrations result in a lower rate of peracetic acid hydrolysis, thereby better maintaining the concentration of peracetic acid in solution at a level sufficient to affect decolorization, albeit with longer incubation times.

Figure 8A:
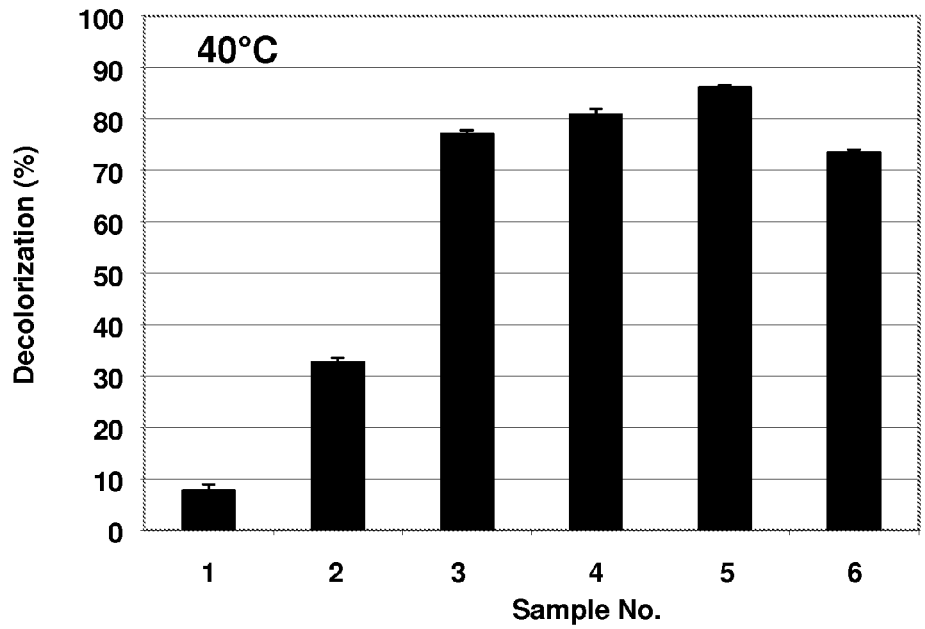
FIGS. 8A and 8B are graphs showing the percentages of Reactive Black 5 decolorization at 40° C. and 45° C., respectively, at different EGDA/enzyme/$H_2O_2$ ratios.
Figure 8B:
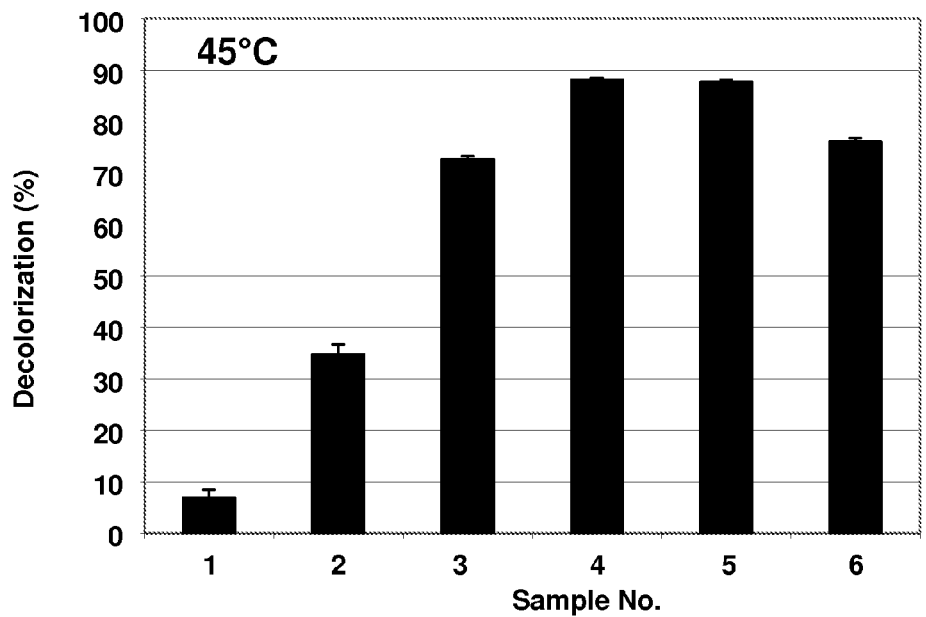

FIGS. 8A and 8B shows the percentage of decolorization observed using each of the samples identified in Table 4 at different temperatures (40° C. and 45° C., respectively). The beneficial effects of increasing the EGDA/enzyme ratio are apparent. The effect of using different amounts of enzyme are less pronounced in this experiment.

Decolorization of Reactive Violet 5R

Experimental samples were prepared as described in Table 5.

Figure 9:
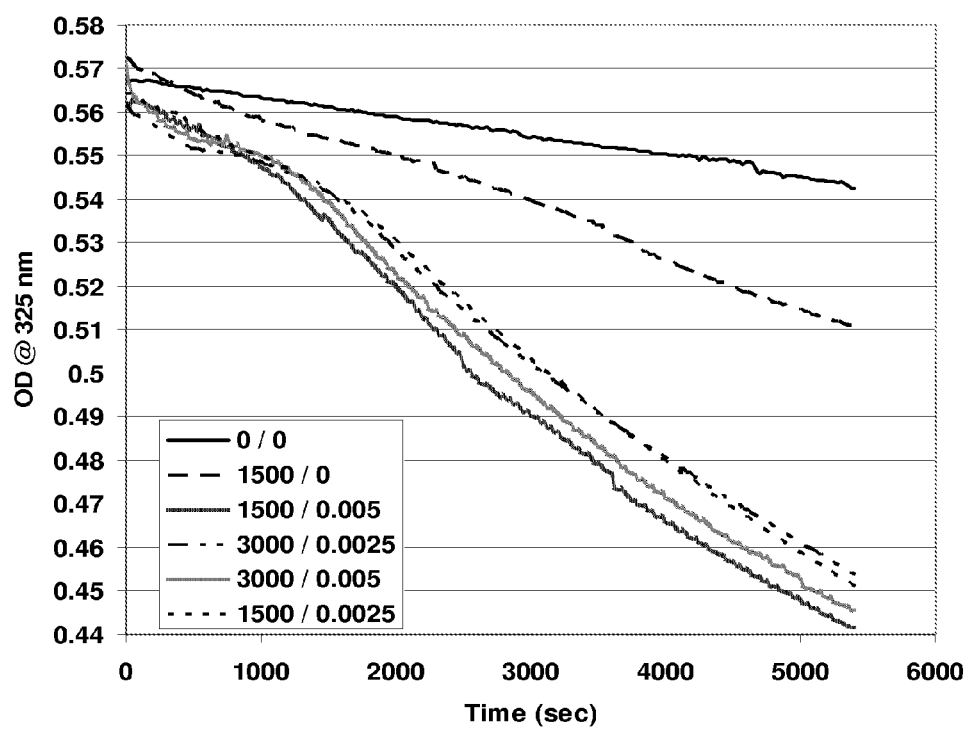
FIG. 9 is a graph showing the effect of EGDA/enzyme/$H_2O_2$ ratios on oxidative decolorization of Reactive Violet 5R at room temperature.

The graph in FIG. 9 shows the decrease in absorbance at 325 nm at room temperature with different ratios of EGDA/enzyme. During the course of the experiment (1.5 hr), the rates of decolorization (as estimated by the negative slopes of the data series) appeared to be similar for all samples containing enzyme (i.e., data series A3-A6). Decolorization with the control samples [$H_2O_2$ only (i.e., "0/0") and $H_2O_2$/EGDA (i.e., "1500/0")] was more pronounced than observed for Reactive Black 5; although the addition of EGDA and enzyme clearly increased the amount of decolorization.

Figure 10:
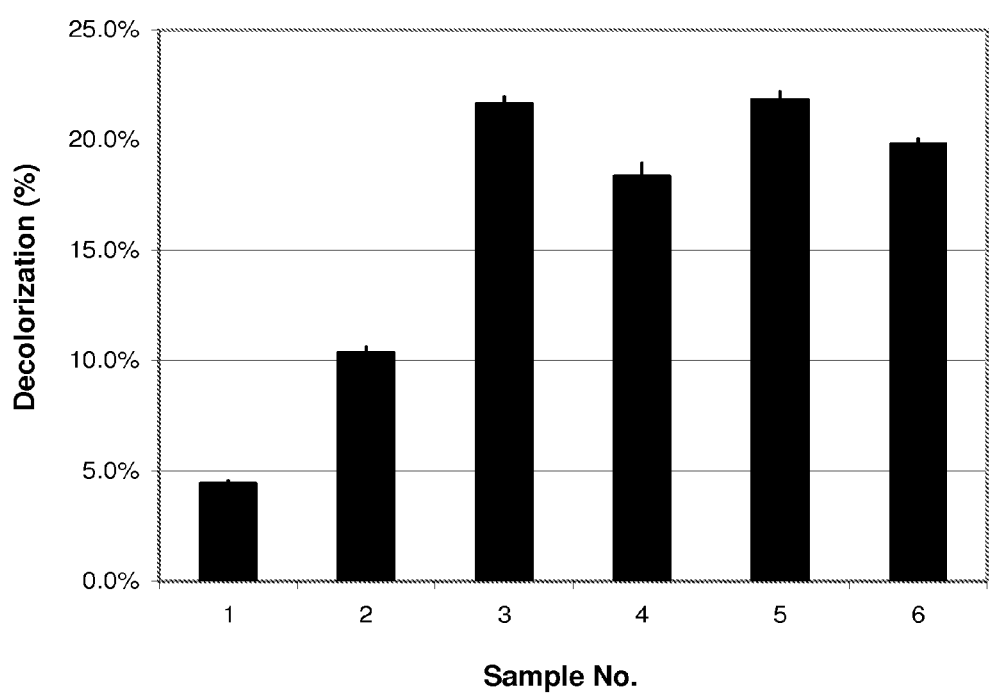
FIG. 10 is a graph showing the percentages of Reactive Violet 5R decolorization at room temperature.

The graph in FIG. 10 shows the percentage of decolorization observed using each of samples described in Table 5. After 1.5 hr, some decolorization was observed for $H_2O_2$ alone (approximately 5%; sample 1). The presence of EGDA increased decolorization to about 10% (sample 2). As was also observed for Reactive Black 5, it is possible that the combination of EGDA and $H_2O_2$ in a basic medium generated a low level of peracetic acid that was capable of decolorization at a faster rate than with peroxide alone. Addition of enzyme had a pronounced effect on increasing decolorization, increasing it to about 18-22%, depending on the ratio of EGDA/enzyme and the amount of enzyme.

Figure 11A:
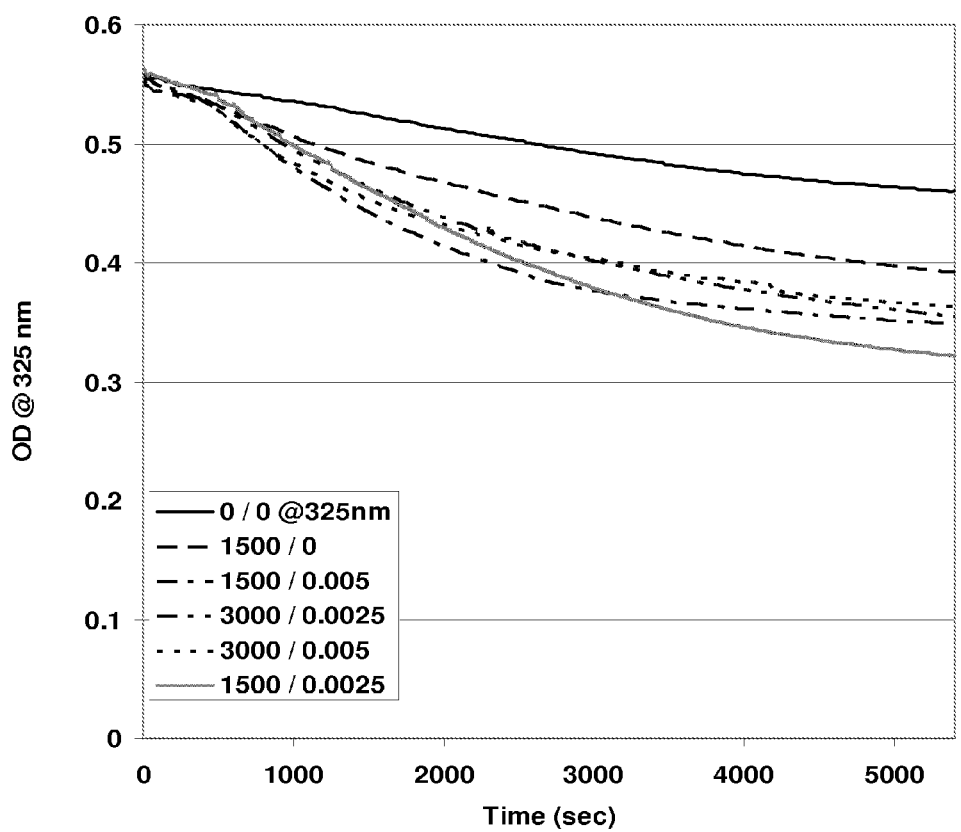
FIGS. 11A and 11B are graphs showing the effect of different EGDA/enzyme/$H_2O_2$ ratios on decolorization of Reactive Violet 5R at 40° C., monitored at two wavelengths, 325 nm and 560 nm, respectively.
Figure 11B:
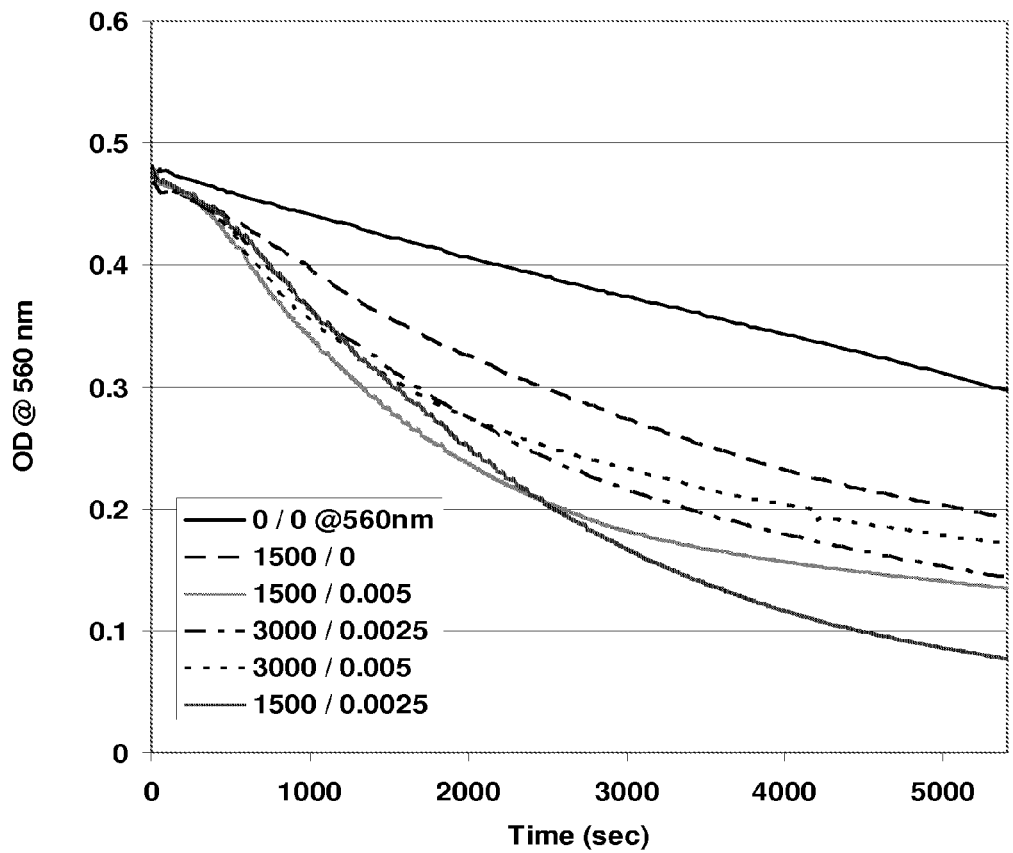

The decolorization experiment was repeated at 40° C., using the same sample setup as shown in Table 5. The 96-well plates containing the samples were pre-incubated at 40° C. prior to addition of $H_2O_2$, and absorbance was read at 325 nm and 560 nm for 1.5 hr in a plate reader conditioned to 40° C. The resulting decolorization curves are shown in FIGS. 11A and 11B, along with the curves obtained at room temperature, for comparison.

Figure 12A:
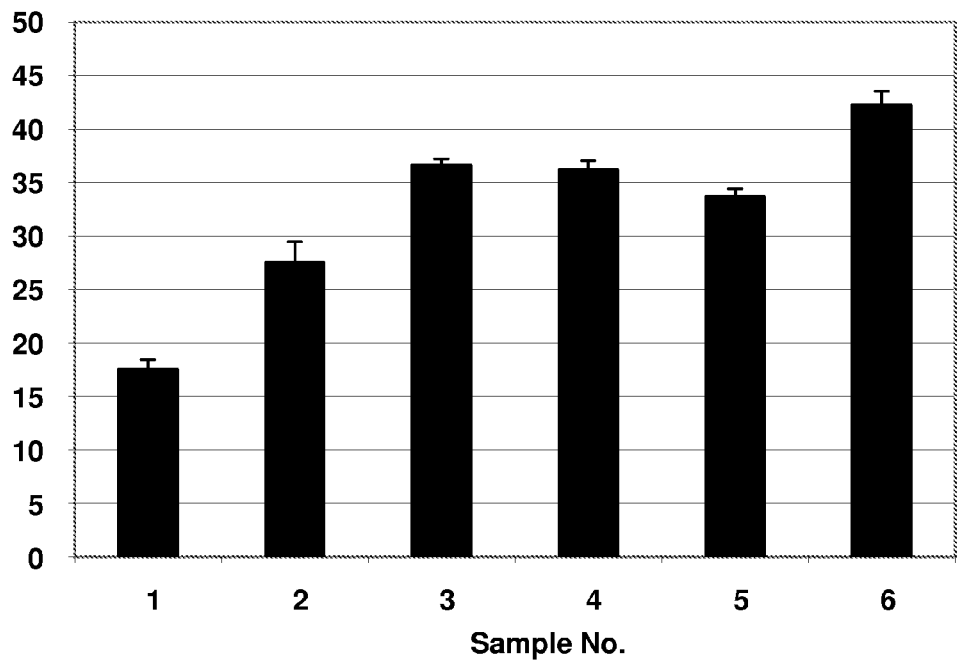
FIGS. 12A and 12B are graphs showing the percentages of decolorization of Reactive Violet 5R at 25° C. (light colored bars) and 40° C. (dark bars), when monitored at 325 nm.
Figure 12B:
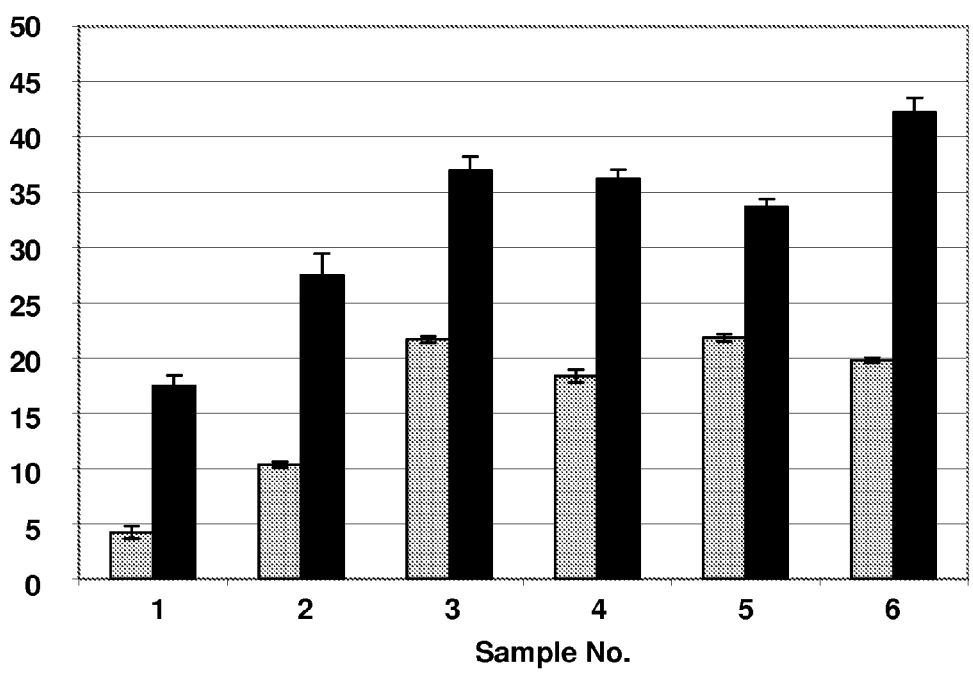

The graph in FIG. 12A shows the percentage of decolorization observed after 1.5 hr for each experimental sample in Table 4 at 40° C. The graph in FIG. 12B further includes a comparison with decolorization at room temperature.

Figure 13:
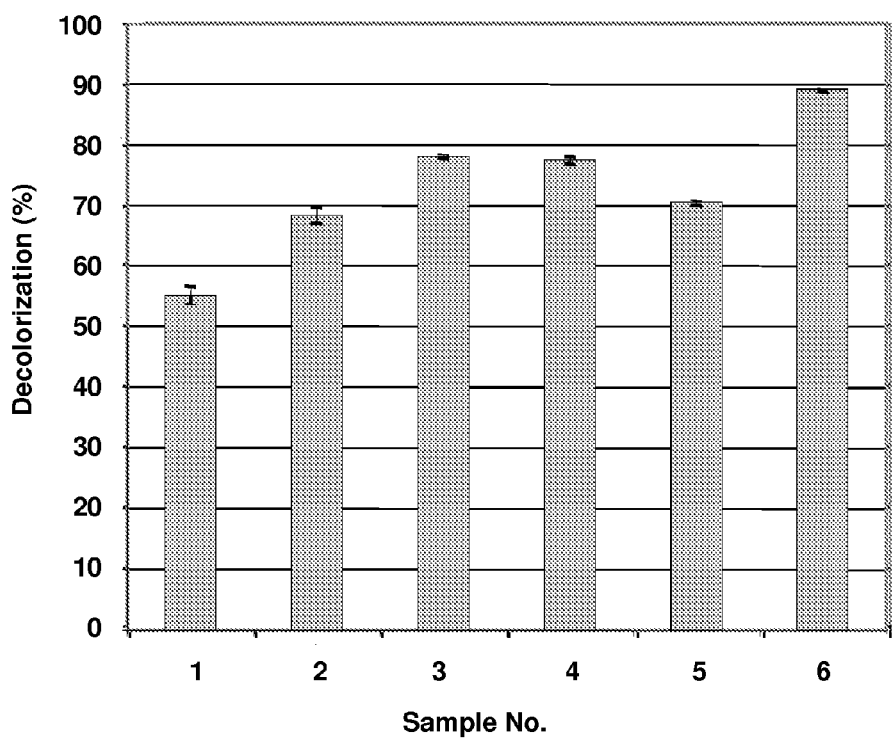
FIG. 13 is a graph showing the effect of different EGDA/enzyme/$H_2O_2$ ratios on decolorization of Reactive Violet 5R at 40° C. for 2 hours, monitored at 560 nm.

The graph in FIG. 13 shows the results after 2 hours at 40° C., following absorbance at 560 nm. The percentage of decolorization for samples containing enzyme reached a level as high as 90%. The best performance in decolorization occurred with samples containing a smaller ratio of enzyme.

Example 2

Decolorization of Paper Mill Wastewater

The following aqueous composition was used for enzymatic generation of peracetic acid:

TABLE 5

| | Sample | | | | | |
|---|---|---|---|---|---|---|
| | 1 | 2 | 3 | 4 | 5 | 6 |
| Dye (M) | $3.4 \times 10^{-5}$ | $3.4 \times 10^{-5}$ | $3.4 \times 10^{-5}$ | $3.4 \times 10^{-5}$ | $3.4 \times 10^{-5}$ | $3.4 \times 10^{-5}$ |
| EGDA (M) | 0 | 0.0510 | 0.0510 | 0.1020 | 0.1020 | 0.0510 |
| Enzyme (M) | 0 | 0 | $1.7 \times 10^{-7}$ | $8.5 \times 10^{-8}$ | $1.7 \times 10^{-7}$ | $8.5 \times 10^{-8}$ |
| $H_2O_2$ (M) | 0.0510 | 0.0510 | 0.0510 | 0.0510 | 0.0510 | 0.0510 |

1.25 g sodium percarbonate,
1.8 ml propylene glycol diacetate (PGDA),
27 mg perhydrolase enzyme (S54V variant of *M. smegmatis* perhydrolase; SEQ ID NO: 3) in a granular formulation containing 6.6% perhydrolase enzyme (w/w), and
250 ml distilled water.

This composition produced 0.18% (1800 ppm) peracetic acid (PAA) after 20 minutes incubation. In this experiment, the 20-minute time-point for PAA accumulation was designated $t_0$. Dilutions were used to produce lower concentrations of PAA. PAA was measured using Peracetic Acid Test Strips (Merck).

50 ml samples of fine paper mill wastewater effluent were treated with 20, 45, 150, and 300 ppm enzymatically-generated PAA for 30 minutes after $t_0$. Enzymatically generated PAA (Enz PAA) was compared with equivalent amounts of distilled PAA (dPAA) and a no PAA control/reference.

Color removal was determined according to the ISO 7887:1994 standard. Briefly, the samples were filtered using 0.45 μm filters and the absorbance measured at 436, 525, and 620 nm. The spectral absorption coefficient was calculated with the formula: $a(\lambda)=A/d*f$; where $a(\lambda)$ is the spectral absorption coefficient, $m^{-1}$; d is the optical path-length, mm; and f is the factor used to give the spectral coefficient in reciprocal meters (f=1000). The results are tabulated in Table 6.

TABLE 6

Spectral absorption coefficients for treated paper mill wastewater effluent

| Sample | 620 nm, $(m^{-1})$ | 525 nm, $(m^{-1})$ | 436 nm, $(m^{-1})$ |
|---|---|---|---|
| Reference | 1.5 | 2.7 | 4.4 |
| Enz PAA, 20 ppm | 0.95 | 1.95 | 3.95 |
| Enz PAA, 48 ppm | 0.65 | 1.45 | 3.15 |
| Enz PAA, 150 ppm | 0.4 | 0.6 | 2.05 |
| Enz PAA, 300 ppm | 0.45 | 0.55 | 1.8 |
| dPAA, 20 ppm | 0.7 | 1.35 | 3.55 |
| dPAA, 48 ppm | 1.35 | 1.7 | 3.55 |
| dPAA, 150 ppm | 0.5 | 1.05 | 4.3 |
| dPAA, 300 ppm | 0.05 | 0.05 | 1.15 |

Both enzymatically-generated PAA and distilled PAA decreased the color of wastewater in a dose-dependent manner.

Example 3

Color Removal from Deinked Pulp

Color removal from recycled pulp was assessed in 750 ml of 2% deinked pulp at room temperature for 30 minutes with mechanical mixing (400 rpm). Enzymatically generated PAA and distilled PAA were tested at dosages of 1000 ppm. Distilled PAA was diluted into 10 ml of distilled water and added into the pulp sample to yield a calculated concentration of 1000 ppm. For enzyme-treated samples, the enzyme-containing composition was added directly into the pulp. Hand sheets made from the pulp samples were subjected to brightness analysis according to the ISO 2470:1999 standard. The color of the water phase was determined according to the ISO 7887:1994 standard, as described in Example 2. The results are tabulated in Tables 7 and 8.

TABLE 7

Brightness of treated hand sheets made from deinked pulp

| Point of Measurement | Number of Tests | Reference Brightness, % (std. dev.) | Enz PAA Brightness, % (std. dev.) | dPAA Brightness, % (std. dev.) |
|---|---|---|---|---|
| Wire side | 4 | 57.5 (0.3) | 59.9 (0.1) | 58.8 (0.6) |
| Top side | 4 | 58.6 (0.2) | 59.9 (0.4) | 59.8 (0.3) |
| Average | 8 | 58 (0.6) | 59.9 (0.3) | 59.3 (0.7) |

TABLE 8

Spectral absorption coefficients of water phase from deinked pulp samples

| Sample | 620 nm, $(m^{-1})$ | 525 nm, $(m^{-1})$ | 436 nm, $(m^{-1})$ |
|---|---|---|---|
| Reference | 0.4 | 1.35 | 2.03 |
| Enz PAA | 0 | 0.1 | 0.53 |
| dPAA | 0 | 0.15 | 0.83 |

Treatment with both enzymatically-generated PAA and distilled PAA resulted in fewer residual colored compounds in the water phase and slightly brighter hand sheets.

Although the foregoing compositions and methods have been described in some detail by way of illustration and examples for purposes of clarity of understanding, it will be apparent to those skilled in the art that certain changes and modifications may be made. Therefore, the description should not be construed as limiting the scope of the invention, which is delineated by the appended claims.

All publications, patents, and patent applications cited herein are hereby incorporated by reference in their entireties for all purposes and to the same extent as if each individual publication, patent, or patent application were specifically and individually indicated to be so incorporated by reference.

What is claimed is:

1. A method for decolorizing a dye, comprising contacting the dye with a composition comprising:
    a perhydrolase enzyme having at least 90% amino acid sequence identity to the amino acid sequence set forth in SEQ ID NO: 1 or SEQ ID NO: 3,
    an ester substrate for the perhydrolase enzyme, having carboxylic acid ester moieties, and
    a hydrogen peroxide source;
    wherein the carboxylic acid ester moieties of the ester substrate are provided at:
        (i) about 20-20,000 times the molar amount of dye to be decolorized, and
        (ii) a molar ratio of at least $2 \times 10^5/1$ with respect to the perhydrolase enzyme, and;
    wherein a peracid is produced by catalytic action of the perhydrolase enzyme on the ester substrate in the presence of hydrogen peroxide;
    wherein the dye is contacted with the composition for a length of time and under conditions suitable to produce an amount of peracid sufficient to decolorize at least a portion of the dye, and
    wherein the dye is present in an effluent.

2. The method of claim 1, wherein the dye is present in wastewater effluent.

3. The method of claim 2, wherein the wastewater effluent is from a textile processing process.

4. The method of claim 3, wherein the textile processing process is a textile dyeing process.

5. The method of claim 2, wherein the wastewater effluent is from pulp or paper processing process.

6. The method of claim 5, wherein the pulp or paper processing process is a deinking process.

7. The method of claim 1, wherein at least 40% of the dye in the effluent is decolorized.

8. The method of claim 1, wherein at least twice as much of the dye in the effluent is decolorized compared to the amount of dye that is decolorized in an equivalent method lacking the perhydrolase enzyme.

9. The method of claim 1, wherein at least three times as much of the dye in the effluent is decolorized compared to the amount of dye that is decolorized in an equivalent method lacking the perhydrolase enzyme.

10. The method of claim 1, wherein the perhydrolase enzyme catalyzes perhydrolysis of the ester substrate with a perhydrolysis:hydrolysis ratio equal to or greater than 1.

11. The method of claim 1, wherein the perhydrolase enzyme comprises the amino acid sequence set forth in SEQ ID NO: 1.

12. The method of claim 1, wherein the perhydrolase enzyme comprises an amino acid sequence having at least 90% amino acid sequence identity to the amino sequence set forth in SEQ ID NO: 1.

13. The method of claim 1, wherein the perhydrolase enzyme is the S54V variant of the perhydrolase enzyme having the amino acid sequence of SEQ ID NO: 1.

14. The method of claim 1, wherein the perhydrolase enzyme comprises an amino acid sequence having at least 90% amino acid sequence identity to the amino acid sequence set forth in SEQ ID NO: 3.

15. The method of claim 1, wherein the ester substrate is selected from the group consisting of propylene glycol diacetate (PGDA), ethylene glycol diacetate (EGDA), tracetin, ethyl acetate, and tributyrin.

16. The method of claim 1, wherein the hydrogen peroxide is provided in the form of a hydrogen peroxide source selected from the group consisting of hydrogen peroxide, percarbonate, and perborate.

17. The method of claim 1, wherein the dye is a textiles dye.

18. The method of claim 1, wherein the molar ratio of carboxylic acid ester moieties in the substrate to enzyme molecules is from about $4\times10^5/1$ to about $4\times10^6/1$.

19. The method of claim 1, wherein the molar ratio of carboxylic acid ester moieties in the substrate to enzyme molecules is at least about $4\times10^5/1$.

20. The method of claim 1, wherein the molar ratio of carboxylic acid ester moieties in the substrate to dye molecule is from about 1,000/1 to about 10,000/1.

21. The method of claim 1, wherein the concentration of perhydrolase enzyme is less than or equal to $5\times10^{-6}$ M.

\* \* \* \* \*